(12) United States Patent
Liu et al.

(10) Patent No.: US 10,187,569 B2
(45) Date of Patent: Jan. 22, 2019

(54) PORTABLE DEVICE CAPABLE OF GENERATING PANORAMIC FILE

(71) Applicant: MEDIATEK INC., Hsinchu (TW)

(72) Inventors: Tsu-Ming Liu, Hsinchu (TW); Kui-Chang Tseng, Kaohsiung (TW); Chi-Cheng Ju, Hsinchu (TW); Chih-Ming Wang, Zhubei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/310,235

(22) PCT Filed: Jul. 28, 2015

(86) PCT No.: PCT/CN2015/085298
§ 371 (c)(1),
(2) Date: Nov. 10, 2016

(87) PCT Pub. No.: WO2016/015624
PCT Pub. Date: Feb. 4, 2016

(65) Prior Publication Data
US 2017/0272698 A1 Sep. 21, 2017

Related U.S. Application Data

(60) Provisional application No. 62/029,657, filed on Jul. 28, 2014.

(51) Int. Cl.
*H04N 5/232* (2006.01)
*G06T 3/40* (2006.01)
(Continued)

(52) U.S. Cl.
CPC ......... *H04N 5/23238* (2013.01); *G06F 3/016* (2013.01); *G06F 3/0488* (2013.01);
(Continued)

(58) Field of Classification Search
USPC ...................................................... 348/14.03
See application file for complete search history.

(56) References Cited

U.S. PATENT DOCUMENTS 8,717,405 B2 5/2014 Li et al.
2009/0290033 A1 11/2009 Jones et al.
(Continued)

FOREIGN PATENT DOCUMENTS

CN 101146231 A 3/2008
CN 101378559 3/2009
(Continued)

OTHER PUBLICATIONS

International Search Report dated Sep. 24, 2015, issued in application No. PCT/CN2015/085298.
(Continued)

*Primary Examiner* — Amal Zenati
(74) *Attorney, Agent, or Firm* — Oblon, McClelland, Maier & Neustadt, L.L.P.

(57) ABSTRACT

A portable device capable of building a panorama, a panoramic video or/and a panoramic audio. The portable device has a plurality of sensors with overlapping sensing areas and an input device receiving a trigger signal that triggers the sensors to sense data for generating a panoramic photo/video/audio file.

21 Claims, 34 Drawing Sheets

(51) Int. Cl.

| | |
|---|---|
| *H04N 5/262* | (2006.01) |
| *G06T 7/70* | (2017.01) |
| *G06F 3/01* | (2006.01) |
| *G06F 3/0488* | (2013.01) |
| *G06F 3/16* | (2006.01) |
| *G06K 9/00* | (2006.01) |
| *H04N 5/04* | (2006.01) |
| *H04N 5/247* | (2006.01) |
| *H04N 7/01* | (2006.01) |
| *H04N 7/14* | (2006.01) |
| *H04N 7/15* | (2006.01) |
| *G06K 9/62* | (2006.01) |
| *H04N 5/225* | (2006.01) |
| *H04N 5/235* | (2006.01) |
| *H04N 7/18* | (2006.01) |

(52) U.S. Cl.
CPC ........... *G06F 3/16* (2013.01); *G06K 9/00255* (2013.01); *G06K 9/6267* (2013.01); *G06T 3/4038* (2013.01); *G06T 7/70* (2017.01); *H04N 5/04* (2013.01); *H04N 5/2258* (2013.01); *H04N 5/2353* (2013.01); *H04N 5/23212* (2013.01); *H04N 5/23216* (2013.01); *H04N 5/23229* (2013.01); *H04N 5/23241* (2013.01); *H04N 5/23293* (2013.01); *H04N 5/247* (2013.01); *H04N 5/2624* (2013.01); *H04N 7/0127* (2013.01); *H04N 7/147* (2013.01); *H04N 7/15* (2013.01); *H04N 7/188* (2013.01)

(56) References Cited

U.S. PATENT DOCUMENTS

| | | | |
|---|---|---|---|
| 2010/0097443 A1* | 4/2010 | Lablans | G03B 37/00 348/36 |
| 2011/0110605 A1 | 5/2011 | Cheong | |
| 2011/0292233 A1* | 12/2011 | Chu | H04N 5/2253 348/222.1 |
| 2013/0346916 A1 | 12/2013 | Williamson et al. | |
| 2014/0118487 A1* | 5/2014 | Shikata | H04N 5/232 348/36 |
| 2015/0085184 A1* | 3/2015 | Vidal | H04N 5/2252 348/376 |
| 2015/0350716 A1* | 12/2015 | Kruglick | H04N 21/4394 386/241 |

FOREIGN PATENT DOCUMENTS

| | | |
|---|---|---|
| CN | 101771830 | 7/2010 |
| CN | 101902571 | 12/2010 |
| CN | 102216959 | 10/2011 |
| CN | 102263926 | 11/2011 |
| CN | 103873764 A | 6/2014 |
| CN | 102216959 B | 8/2015 |
| WO | WO 2013/162585 | 10/2013 |
| WO | WO 2013186804 A1 | 12/2013 |

OTHER PUBLICATIONS

International Search Report dated Sep. 25, 2015, issued in application No. PCT/CN2015/085292.

CN Office Action dated Apr. 23, 2018 in Application No. 201580002783.X (No English translation), 8 pages.

* cited by examiner

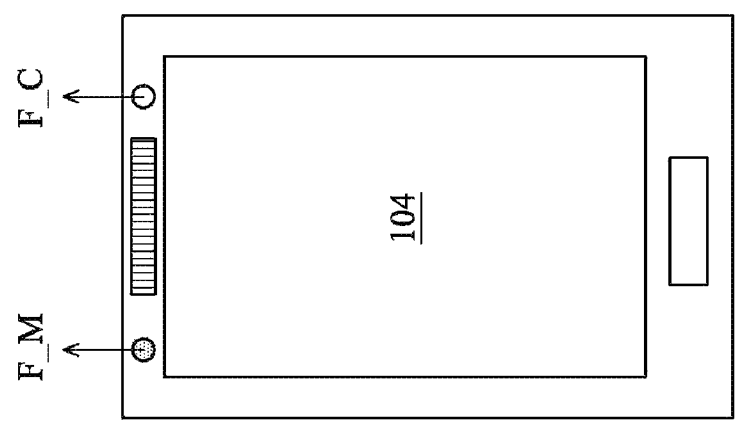

PORTABLE DEVICE CAPABLE OF GENERATING PANORAMIC FILE

CROSS REFERENCE TO RELATED APPLICATIONS

This application claims the benefit of U.S. Provisional Application No. 62/029,657 filed Jul. 28, 2014, the entirety of which is/are incorporated by reference herein.

TECHNICAL FIELD

The present invention relates to a portable device capable of generating a panoramic photo/video/audio file.

BACKGROUND

Traditionally, a panorama photo is generated by multiple photographs captured by a single camera (e.g. the rear camera) of a smartphone. It may take a long time to capture all of the photographs by the single camera and is very inconvenient.

A portable device that can easily generate a panoramic photo, or panoramic video, or panoramic audio file, is called for.

SUMMARY

A portable device in accordance with an exemplary embodiment of the disclosure comprises a plurality of sensors with overlapping sensing areas and an input device receiving a trigger signal that triggers the sensors to sense data for generating a panoramic file. The panoramic file may be a panoramic photo/video/audio file.

In an exemplary embodiment, the portable device further comprises a panoramic image processor, and the sensors comprise a plurality of image sensors for capturing a plurality of images. The panoramic image processor processes (e.g. image standardization) the images to form a panorama.

The portable device may further comprise a motion-sensing module collecting motion information about the portable device when the images are being captured. The panoramic image processor may process the images to form the panorama based on the motion information.

In an exemplary embodiment, the image sensors consecutively capture images to record videos to be processed by the panoramic image processor for generating a panoramic video.

In an exemplary embodiment, the sensors further comprise a plurality of microphones. The microphones record sounds for generating a panoramic audio that varies with a panoramic view window. The sounds may be packed with the panoramic video according to a timestamp for synchronization between video and audio.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein:

FIGS. 4A-4F depict sensor arrangement of a smartphone in accordance with an exemplary embodiment of the disclosure, for panoramic photo/video/audio file generation;

DETAILED DESCRIPTION

The following description shows exemplary embodiments of carrying out the invention. This description is made for the purpose of illustrating the general principles of the invention and should not be taken in a limiting sense. The scope of the invention is best determined by reference to the appended claims.

Figure 1:
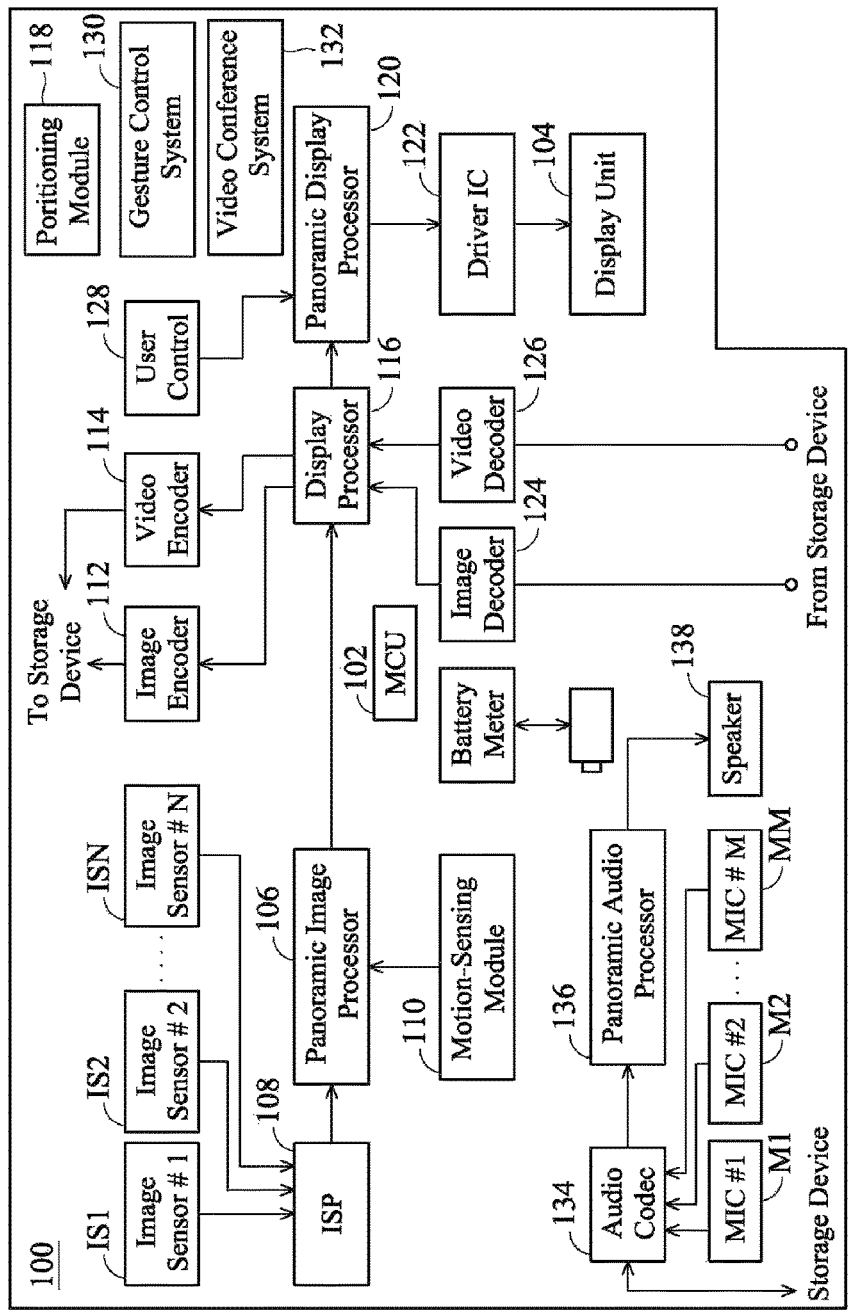
FIG. 1 is a block diagram depicting a portable device 100 capable of building a panoramic photo/video/audio file.

FIG. 1 is a block diagram depicting a portable device 100 capable of generating a panoramic photo/video/audio file. The panoramic experience established in accordance with the panoramic photo or video or audio file may be provided in a field of view/sound over 180 degrees.

The portable device 100 comprises at least one of a plurality of image sensors (e.g. cameras) IS1, IS2 . . . ISN, a plurality of microphones M1, M2 . . . MM, a display unit 104 or combination thereof. When a user operates a trigger function (for example, by a single touch on a shutter/trigger icon displayed on a touch panel, or by a single press on a shutter/trigger button) for generating a panoramic photo/video/audio file, the image sensors IS1 to ISN may be triggered to capture images or to record videos, or the microphones M1 to MM may be triggered to record sounds. In some embodiments, when a user operates a trigger function for generating a panoramic photo/video/audio file, the image sensors IS1 to ISN and the microphones M1 to MM may be triggered at the same time. The image sensors IS1 to ISN have overlapping fields of view. For example, at least one pair of adjacent image sensors corresponds to an overlapping sensing area. The microphones M1 to MM have overlapping fields of sound. For example, at least one pair of adjacent microphones corresponds to an overlapping sensing area.

Figure 14:
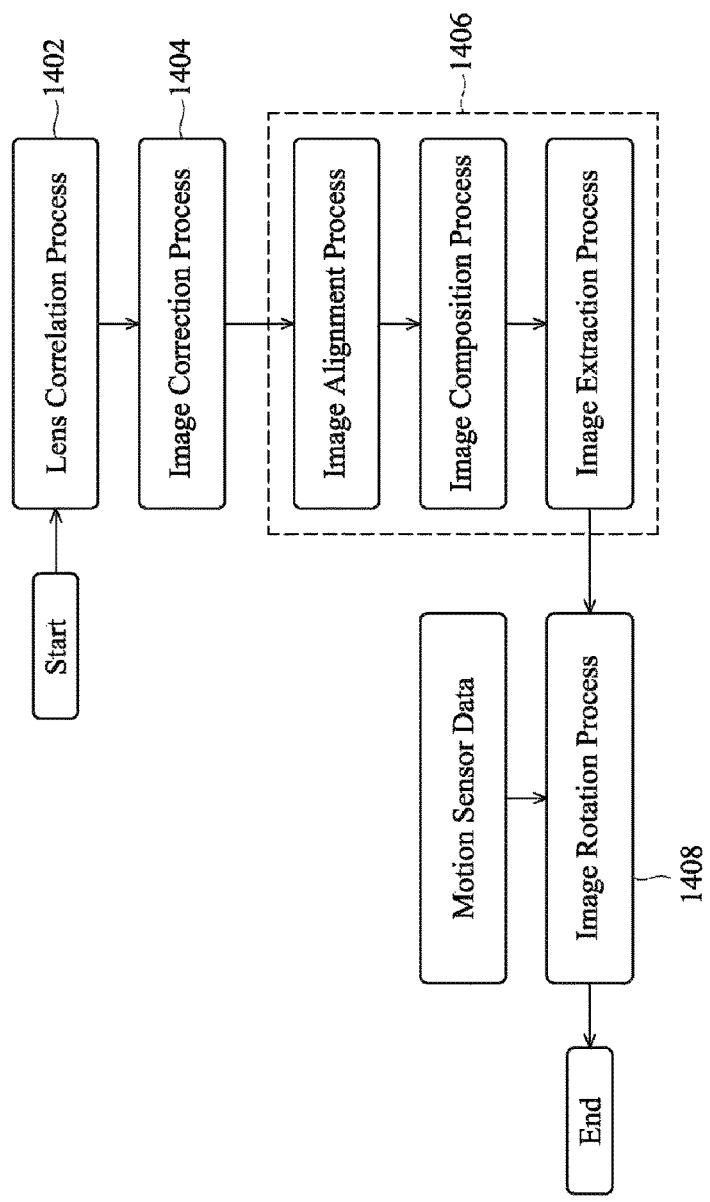
FIG. 14 is a flowchart depicting the operations of the panoramic image processor 106.

In an embodiment to generate a panoramic photo/video file, a panoramic image processor 106 is coupled to the image signal processor 108 of the image sensors IS1 . . . ISN to process the N images to form a panorama. In some embodiments, the panoramic image processor 106 may further standardize the N images to form a panorama. For example, the adaptive panoramic image processor 106 may standardize the configurations of the N images, such that the configurations of the N images (e.g. lens setting, ISO setting, image resolution, any other setting related to the N images, or combination thereof) may be the same or similar and, then, the panorama may be formed based on the standardized N images. FIG. 14, a flowchart depicting the operations for generating a panoramic photo/video file performed by, but not limitation, the panoramic image processor 106, shows the examples of standardizing the N images, including the standardization for lens difference or image difference (ISO difference, camera resolution difference and so on). A motion-sensing module 110 may be coupled to the panoramic image processor 106. When the images are being captured, the motion-sensing module 110 may collect motion information about the portable device 100, e.g., posture or movement of the portable device 100. The panoramic image processor 106 takes the motion information into consideration when processing the N images. The panoramic image processor 106 may be coupled to an image encoder 112 and a video encoder 114 via a display processor 116 of the portable device 100. When the image sensors IS1 to ISN just take one photo shoot, a panoramic photo file is generated by the image encoder 112. When the image sensors IS1 to ISN are recording videos, a series of panoramas may be encoded as a panoramic video file by the video encoder 114. The position or height information about the portable device 100 detected by a positioning module 118 of the portable device 100 may be packed into the panoramic photo/video file, such that according to the position or height information about the portable device 100, the panoramic photo/video file may be integrated with another panoramic photo/video file generated by a nearby portable device. Thus, a panorama photo/video with a wide view field may be formed.

The portable device 100 may further comprise a panoramic display processor 120. The panoramic display processor 120 may provide the panorama (or the panoramic video) to a driver IC 122, such that the driver IC 122 drives the display unit 104 to display the panorama (or the panoramic video).

In some exemplary embodiments, the panorama or the panoramic video displayed on the display unit 104 may be retrieved from a storage device rather than directly transmitted from the image sensors IS1 to ISN. The panorama and the panoramic video retrieved from a storage device may be decoded by the image decoder 124 and video decoder 126, respectively, and then, through the display processor 116, the panoramic display processor 120 is operated to provide the panorama or the panoramic video, such that the driver IC 122 drives the display unit 104 to display the panorama or the panoramic video. A panoramic view window on the panorama or the panoramic video may be adjusted via a user control 128.

Furthermore, the portable device 100 may further comprise a gesture control system 130 or a video conference system 132 that use the panoramic photo shooting technology. The gesture control system 130 extracts a user-generated gesture from the captured panoramic video and controls a target device according to the user-generated gesture. The video conference system 132 extracts the image of a user's face from the panoramic video to focus the panoramic view window on the user's face.

In an embodiment to generate a panoramic audio file, the multiple sound signals collected by the microphones M1 to MM are encoded by an audio codec 134 of the portable device 100 and may be stored into a storage device as separate files. When generating a panoramic audio that varies with a panoramic view window, the separate sound files may be read and decoded by the audio codec 134. The portable device 100 includes a panoramic audio processor 136, by which the separate sound files are summed up according to variable weighting factors dependent on the panoramic view window and thereby a panoramic audio may be generated by a speaker 138 of the portable device 100.

Figure 2:
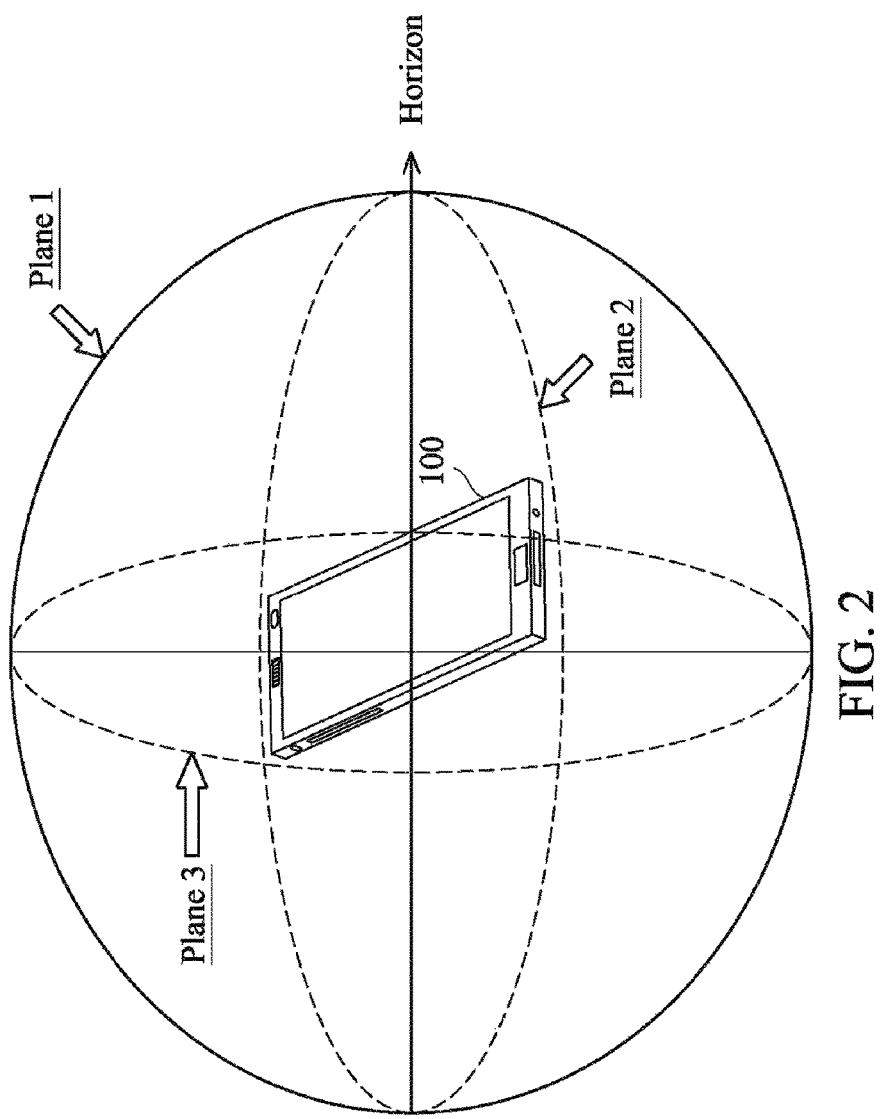
FIG. 2 depicts a 720° field of view/sound around the portable device 100.

FIG. 2 depicts an embodiment about a 720° field of view/sound around the portable device 100. The 720° field of view/sound may be defined with respect to at least one plane (e.g., plane1, plane2, plane 3, any other plane, or combination thereof). In this embodiment, the 720° field may refer to two 360° fields, each of which corresponds to one plane. The image sensors IS1 to ISN or the microphones M1 to MM may be arranged on the portable device 100 with respect to the at least one plane.

Figure 3:
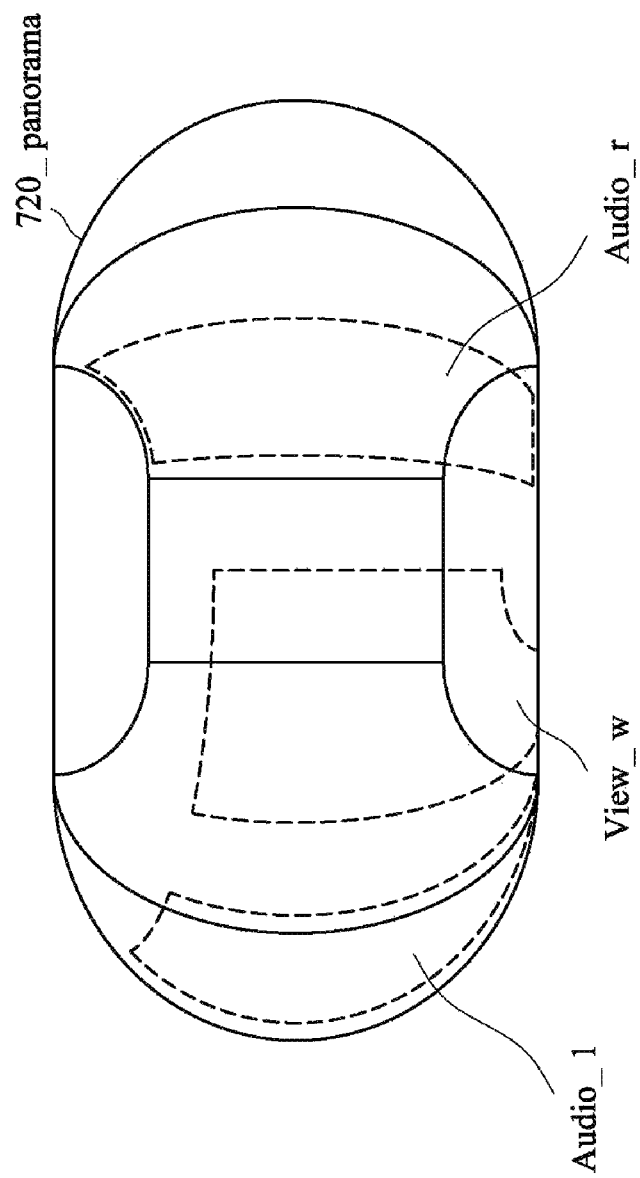
FIG. 3 is an expanded view of a 720° panorama.

FIG. 3 is an embodiment of an expanded view of a 720° panorama 720_panorama. As shown, the 720° panorama 720_panorama is formed from multiple images. A display image displayed on the displayed unit 104 may be determined by moving a panoramic view window View_Won the 720° panorama 720_panorama. For example, an area of the 720° panorama 720_panorama may be selected utilizing the panoramic view window View_W, such that the display image may be generated according to the selected area to be displayed on the display unit 104. According to the position of the panoramic view window View_W, a left channel audio Audio_l and a right channel audio Audio_r may be generated correspondingly, such that the content of the left channel audio Audio_l and right channel audio Audio_r of the panoramic audio may vary with the moving of the panoramic view window View_W.

Figure 4A:
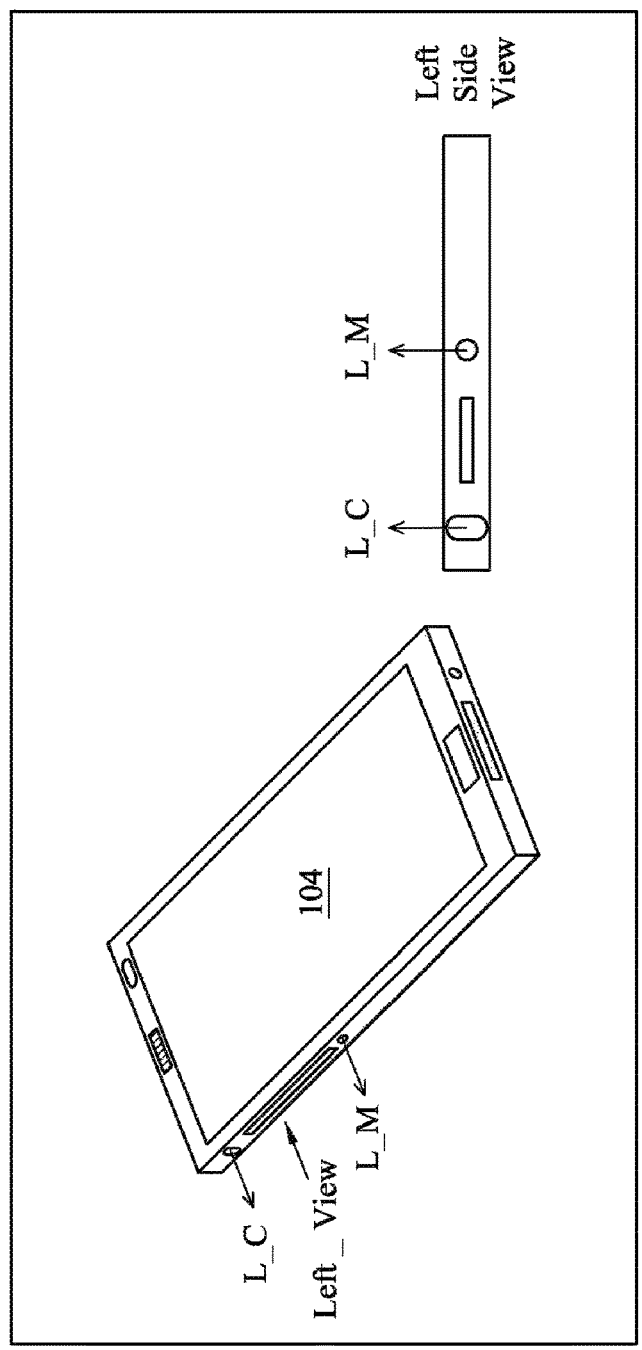
Figure 4B:
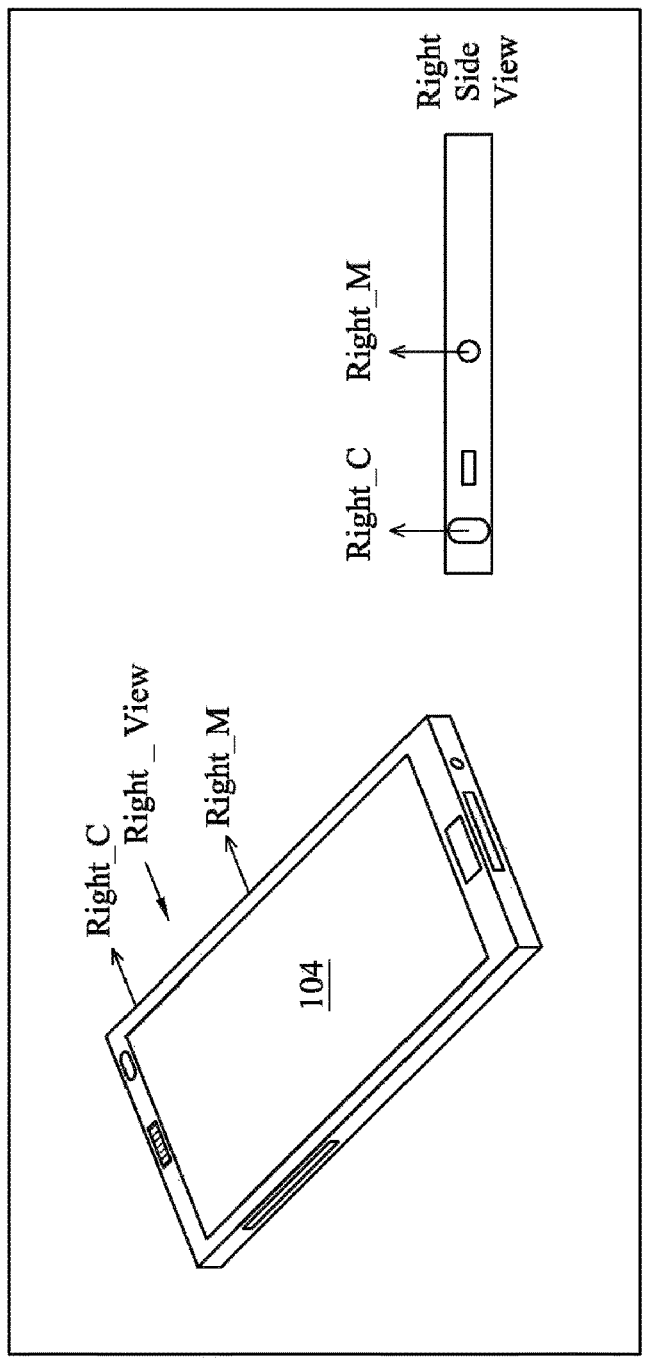
Figure 4C:
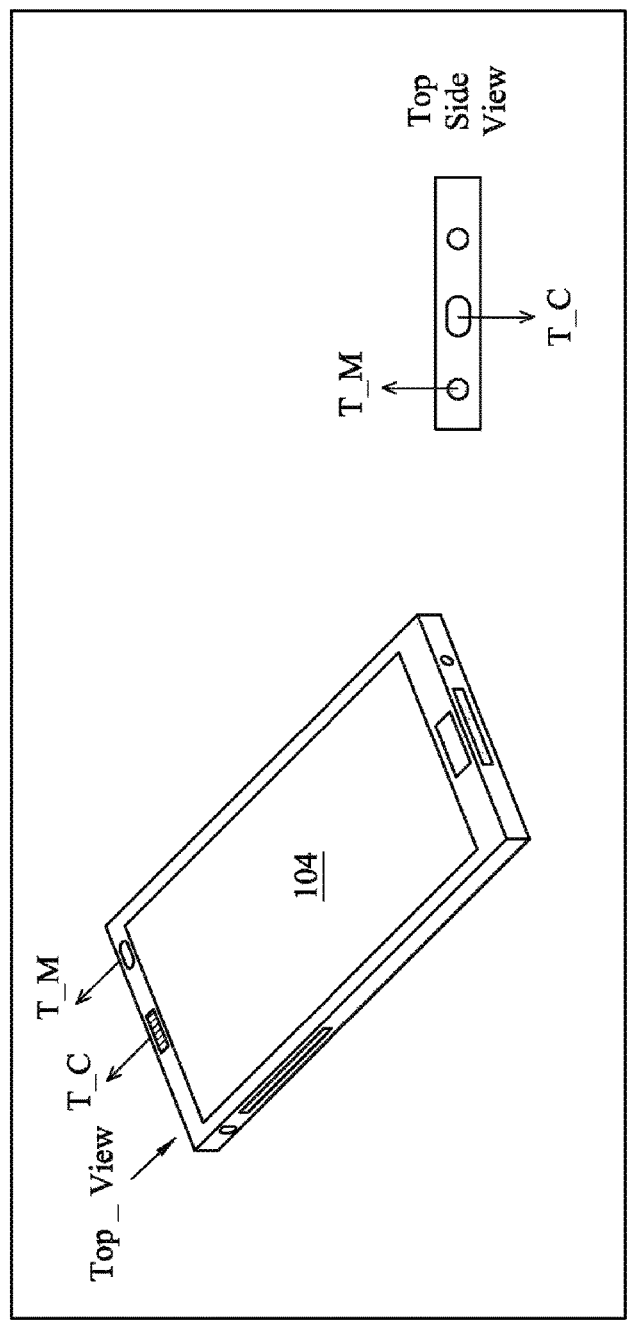
Figure 4D:
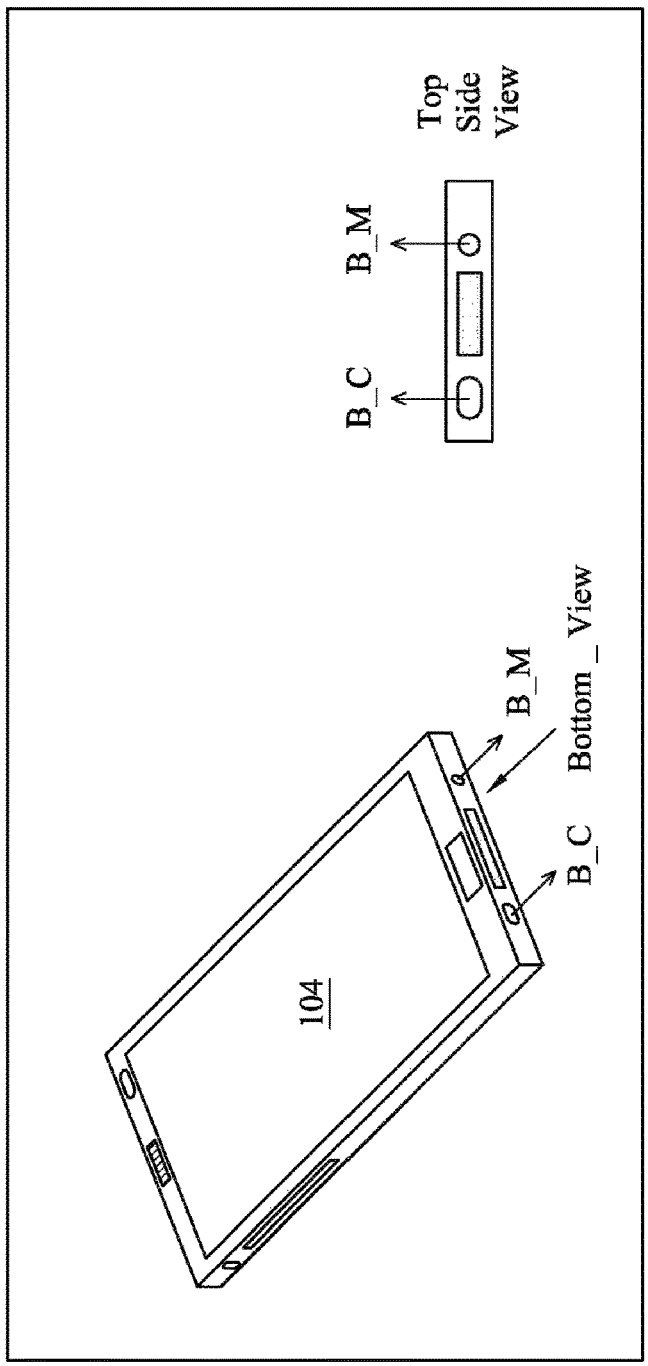
Figure 4F:
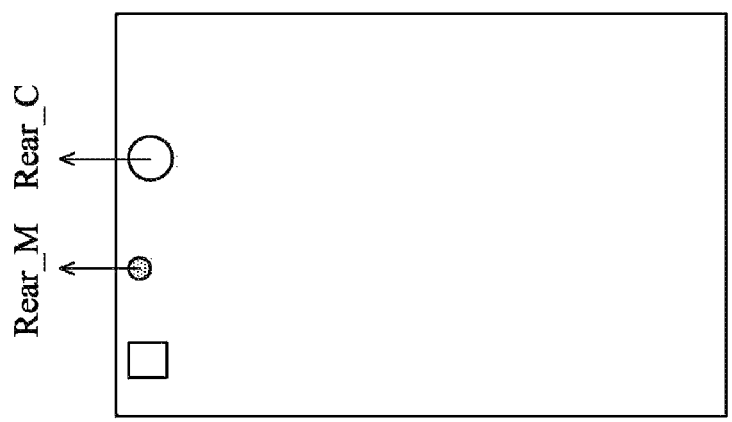

FIGS. 4A-4F depict sensor arrangement of a portable device in accordance with an exemplary embodiment of the disclosure, for generating a panoramic photo/video/audio file. In this embodiment, the sensors (for example, the image sensors IS1, IS2 . . . ISN or the microphones M1, M2 . . . MM) may be disposed on different sides of a case of the portable device. Referring to FIG. 4A, from a left side view (indicated by arrow Left_View) of the portable device, there may be a left camera L_C or a left microphone L_M on the left side of the portable device. Referring to FIG. 4B, from a right side view (indicated by arrow Right_View) of the portable device, there may be a right camera Right_C or a right microphone Right_M on the right side of the portable device. Referring to FIG. 4C, from a top side view (indicated by arrow Top_View) of the portable device, there may be a top camera T_C or a top microphone T_M on the top side of the portable device. Referring to FIG. 4D, from a bottom side view (indicated by arrow Bottom_View) of the portable device, there may be a bottom camera B_C or a bottom microphone B_M on the bottom side of the portable device. Referring to FIG. 4E, from a front side view of the portable device, there may be a front camera F_C or a front microphone F_M on the front side of the portable device. Referring to FIG. 4F, from a rear side view of the portable device, there may be a rear camera Rear_C or a rear microphone Rear_M on the rear side of the portable device. According to the sensor arrangement of FIG. 4A to FIG. 4F, the portable device may be capable of generating a panoramic photo/video/audio file in a 720° field of view/sound around the portable device. The cameras on some or all of these six sides of the portable device may have non-identical configurations, e.g. non-identical ISO values, non-identical pixel resolutions, non-identical pixel types, non-identical frame rates or combination thereof. Some adjustments may be further performed (e.g. standardized to an identical configuration) by the panoramic image processor 106 of FIG. 1 due to the non-identical configurations. In another exemplary embodiment, there may be flash modules on some or all of the six sides of the portable device. The flash modules may have non-identical light intensity. Furthermore, the sampling rates of the sound files may be non-identical and may be further adjusted (e.g. standardized) by the panoramic audio processor 136 of FIG. 1.

In some other embodiments, the arrangement of the cameras/microphones mounted on the portable device 100 may cover a panoramic view/audio field in a form other than 720°. The arrangement of the cameras/microphones should be carefully designed, which should not be limited in this disclosure.

Figure 5:
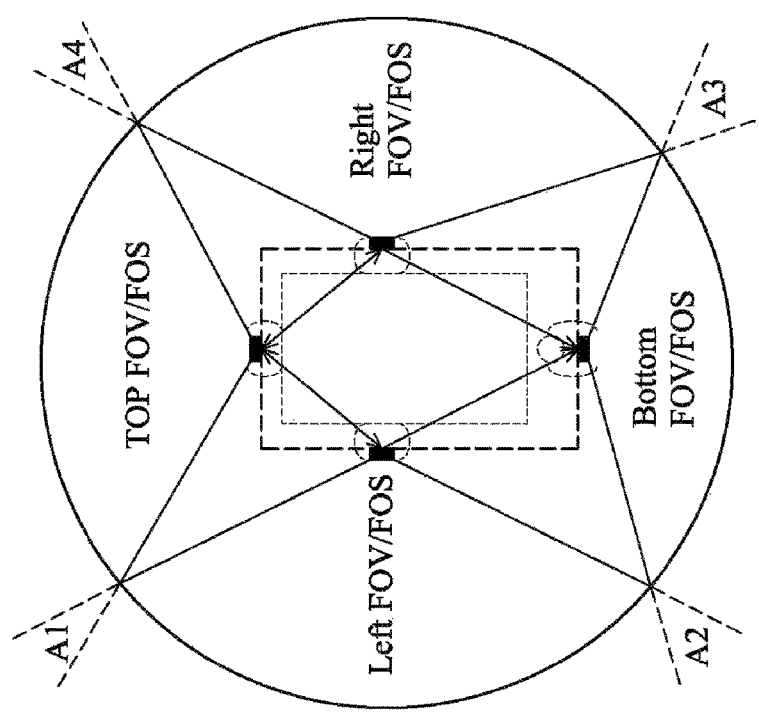
FIG. 5 shows how the left, right, bottom and top cameras/microphones of a smartphone cover a 360° sensing area around the smartphone.

FIG. 5 shows an embodiment about how the left, right, bottom and top cameras/microphones of a portable device cover a 360° sensing area around the portable device. As shown, the top camera/microphone and the left camera/microphone have an overlapping sensing area A1, the left camera/microphone and the bottom camera/microphone have an overlapping sensing area A2, the bottom camera/microphone and the right camera/microphone have an overlapping sensing area A3, and the right camera/microphone and the top camera/microphone have an overlapping sensing area A4. Outside the circle is a 360° effective sensing area.

Figure 6:
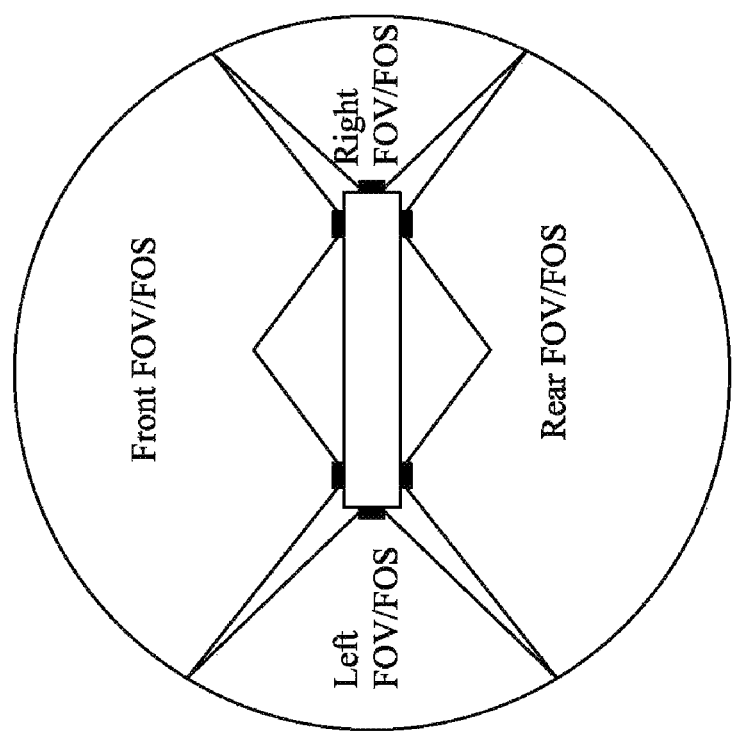
FIG. 6 shows how to cover a 360° sensing area around a smartphone in accordance with another exemplary embodiment of the disclosure.

FIG. 6 shows an embodiment about how to cover a 360° sensing area around a portable device in accordance with another exemplary embodiment of the disclosure. On the front side of the portable device, there may be two cameras/microphones rather than just one single camera/microphone. Thus, the front field of view may be effectively expanded. Similarly, there may be two cameras/microphones on the rear side of the portable device and the rear field of view may be effectively expanded.

Figure 7C:
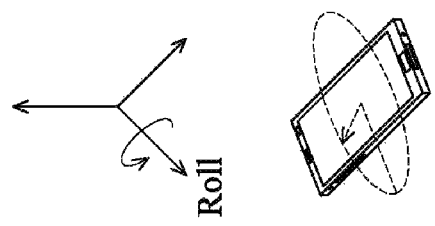
FIGS. 7A, 7B and 7C depict the posture information, yaw, pitch and roll, about the portable device that may be used in standardizing the signals captured by the cameras/microphones.
Figure 7B:
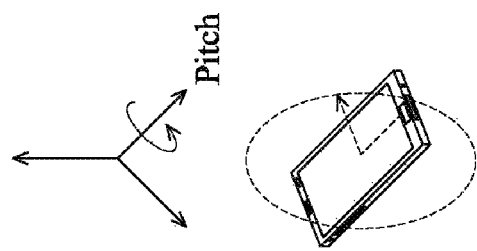
Figure 7A:
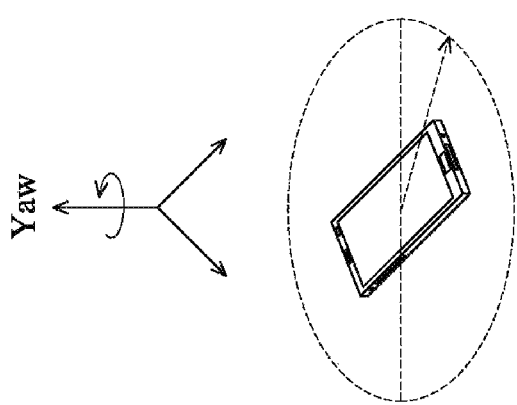

FIGS. 7A, 7B and 7C depict the posture information, yaw, pitch and roll, about the portable device that may be used in processing the signals captured by the cameras/microphones. For example, the panoramic image processor 106 may perform image processing based on the posture information to ensure the images that form a panorama all aligning to the same reference (e.g., with right edges all facing east, with bottom edges all aligned horizontally, or with respect to a same orientation after being aligned). The captured images may be rotated for image alignment (e.g., the captured images may be rotated to make right edges of the images that form a panorama all facing east or to make bottom edges of the images that form a panorama all aligned horizontally). With such image processing, the image quality of the panorama or the panoramic video may not be affected even if the portable device 100 is moved during the capturing of the image sensors IS1 to ISN. The posture information (including yaw, pitch or roll) may be sensed by G sensor, M sensor, gyroscope or any other sensor capable of sensing the posture information. The motion-sensing module 110 of FIG. 1 may include G sensor, M sensor, gyroscope, any other sensor capable of sensing the posture information, or combination thereof.

Figure 8:
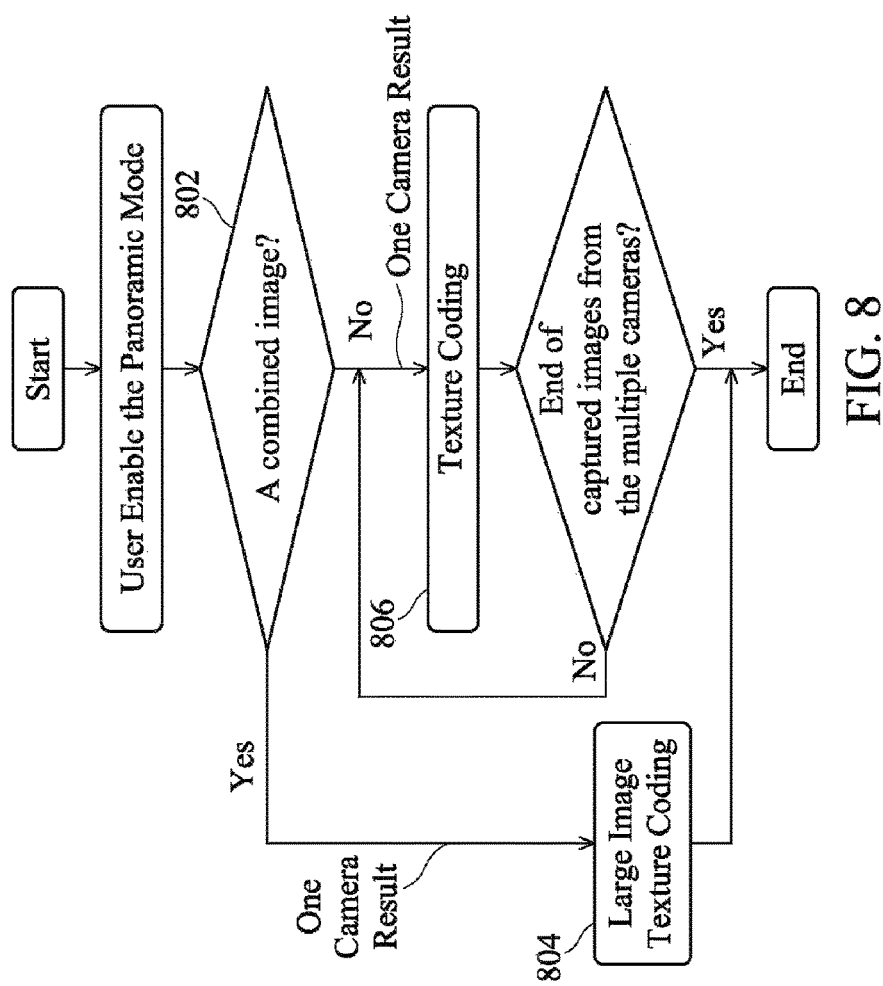
FIG. 8 is a flowchart shows the texture coding of images captured by different cameras.
Figure 9A:
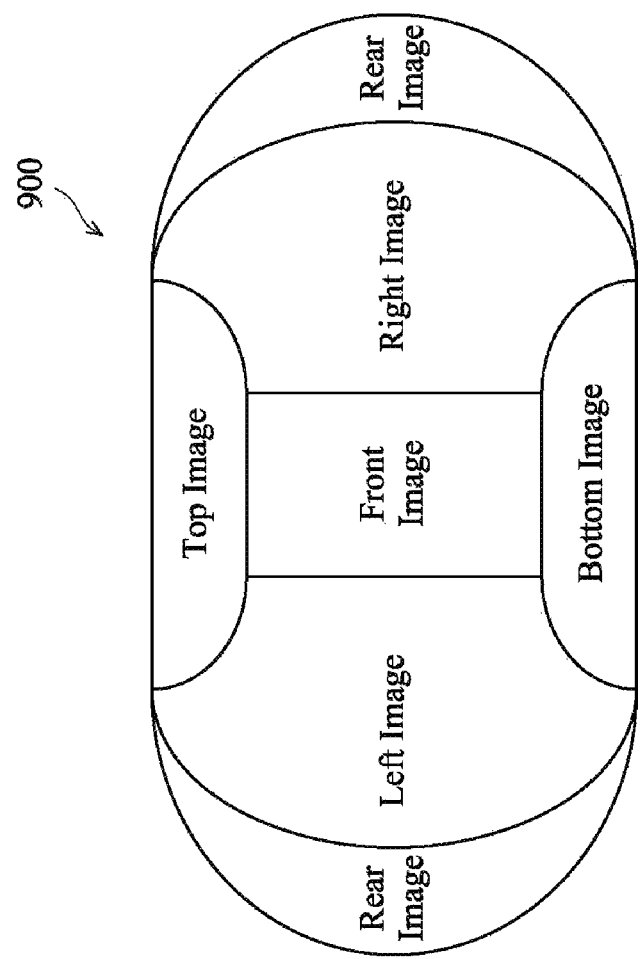
FIG. 9A shows the large image 900 processed by the large-image texture coding 804 and FIG. 9B shows that the images captured by the different cameras are processed separately by the single-camera texture coding 806.
Figure 9B:
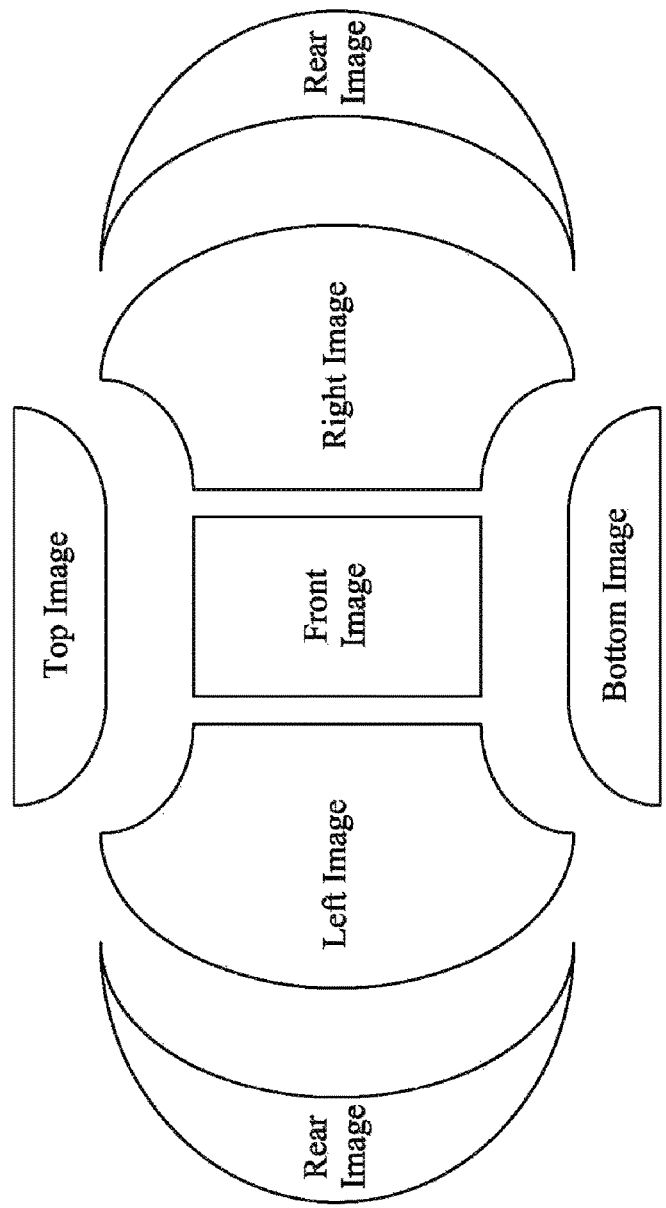

FIG. 8 is a flowchart showing the texture coding of images captured by different cameras. When it is checked in step 802 that the panoramic image processor 106 processes the images captured by the different cameras IS1 to ISN to form a combined image, the images captured by the different cameras IS1 to ISN are processed as a single large image and step 804 is performed for a large-image texture coding. When it is checked in step 802 that a combined image formed by the images captured by the different cameras IS1 to ISN is provided (e.g. by the panoramic image processor 106), the images captured by the different cameras IS1 to ISN are processed one by one. The texture coding 806 is performed on one image each time. FIG. 9A shows an example of the large image 900 (or called a combined image) processed by the large-image texture coding 804. In comparison to FIG. 9A, FIG. 9B shows an embodiment that the separate images captured by the different cameras are processed separately by the single-camera texture coding 806.

In some exemplary embodiments, different encoders are used in step 806 for the different cameras. In some exemplary embodiments, JPEG, GIF, PNG and so on may be used in the texture coding of images, and still profile of MPEG-1, MPEG-2, MPEG-4, WMV, AVS, H.261, H.263, H.264, H.265, VP6, VP8 and VP9 and so on may be used in the texture coding of videos.

Figures 10A, 10B:
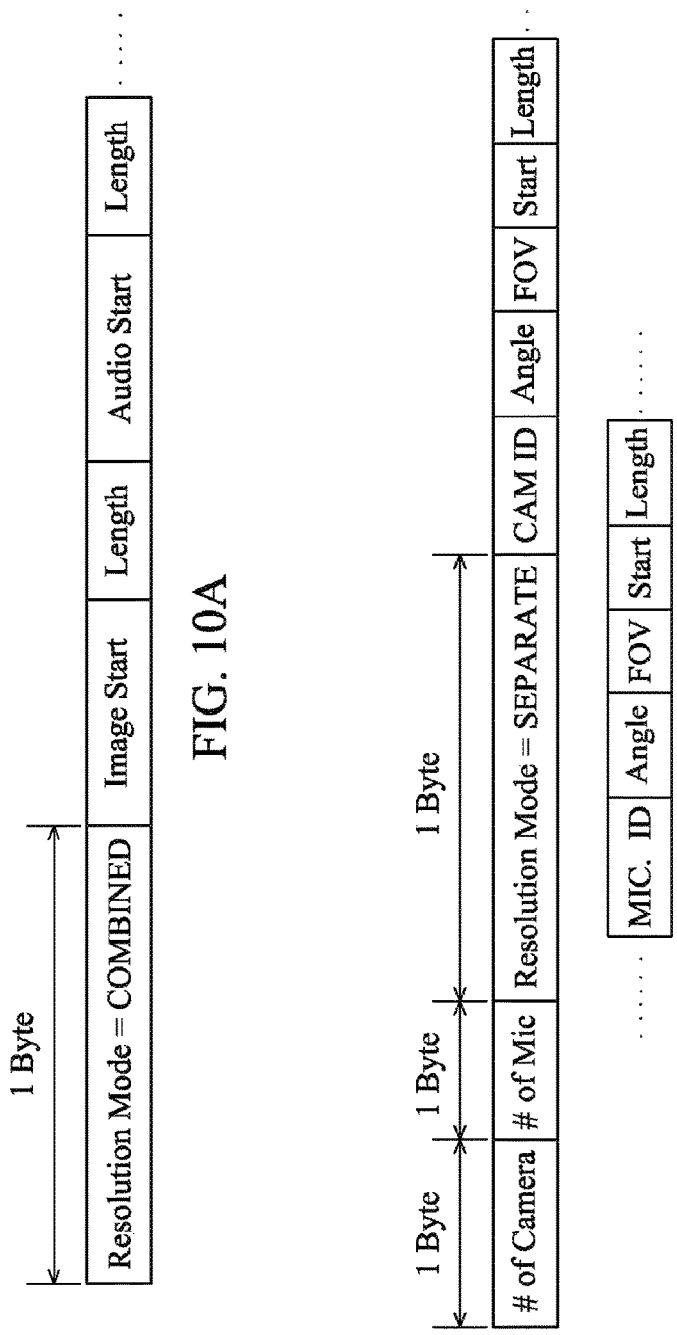
FIG. 10A lists the payload bytes for the combined image of FIG. 9A.
FIG. 10B lists the payload bytes for the separate images of FIG. 9B.

A packing sub-system may be utilized for packing the generated panoramic data. The packing sub-system multiplexes sub-streams from different sensors into one. At the transmitter side, some useful information may be packed into the data stream, for example, the total number of cameras/sensors, the total number of microphones, the image/video resolution or combination thereof. In an exemplary embodiment, the supplemental enhancement information (SEI) of H.264 is used. The user data unregistered SEI message syntax shows the user data payload bytes. FIG. 10A lists an example format of the payload bytes for the combined image of FIG. 9A. FIG. 10B lists an example format of the payload bytes for the separate images of FIG. 9B, with the total number of cameras and the total number of microphones in front of the payload, and the separate image data and audio data is packed in the stream according to the camera ID and the microphone ID. A universal unique identifier may be further coded in the beginning of the payload byte. In some other embodiments, the format may be differed, which should not be limited in this disclosure.

Figure 11:
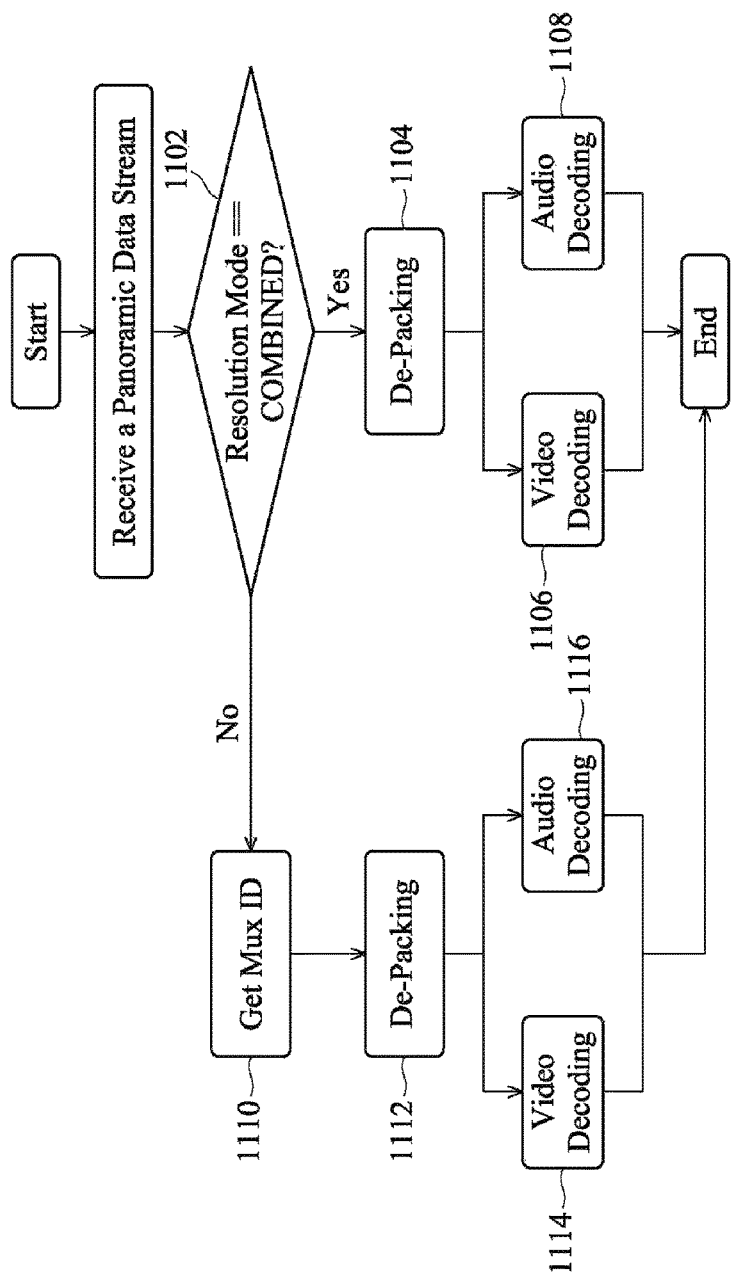
FIG. 11 is a flowchart depicting the de-packing and decoding processes.

In some exemplary embodiments, the de-packing and the de-coding may be the reverse functions of the aforementioned packing and coding processes. FIG. 11 is an embodiment of a flowchart depicting the de-packing and decoding processes. When a panoramic data stream is received, the resolution mode is checked in step 1102. When the resolution mode shows that a combined sensing data (e.g. a combined image as shown in FIG. 9A) is contained in the panoramic data stream, step 1104 is performed to de-pack the data stream and the video or the audio contained therein are decoded in steps 1106 and 1108, respectively. When the resolution mode shows that separate sensing data (e.g. separated images as shown in FIG. 9B) are contained in the panoramic data stream, step 1110 is performed to get the camera number, the microphone number or any other information respectively and the de-pack step 1112 and video decoding step 1114 and the audio decoding step 1116 are performed on the separate videos or the separate audio according to the information gotten at step 1110.

Figure 12:
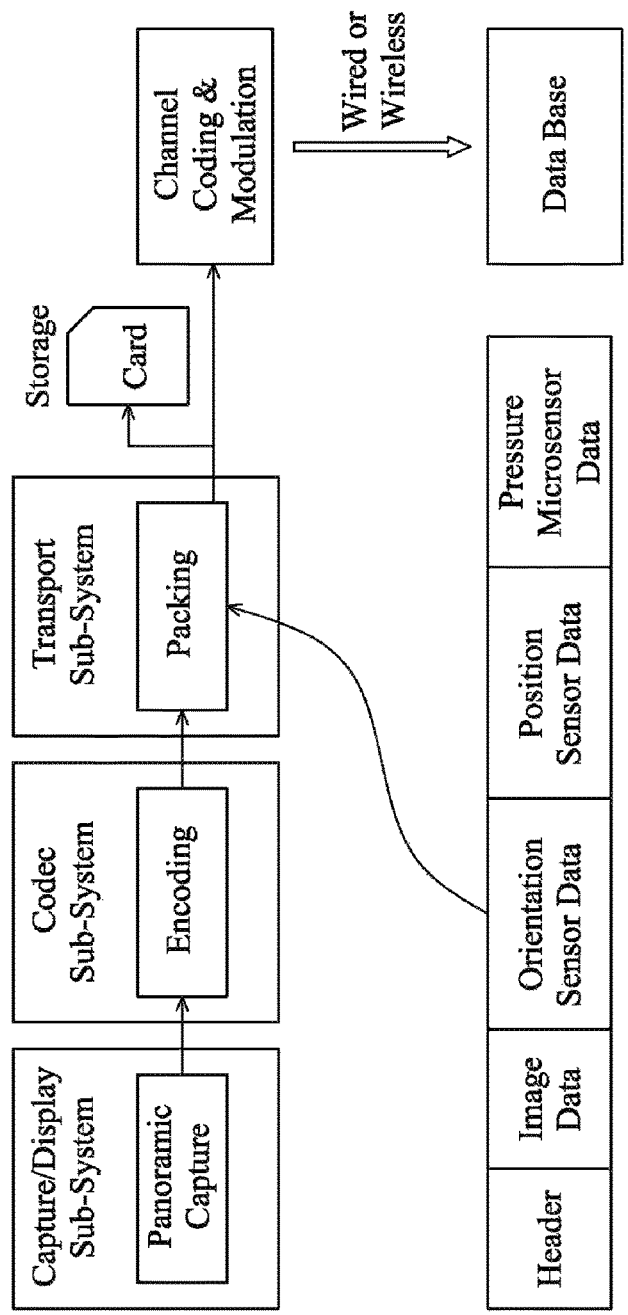
FIG. 12 depicts a data structure of the panoramic data stream in accordance with an exemplary embodiment of the disclosure.
Figure 13:
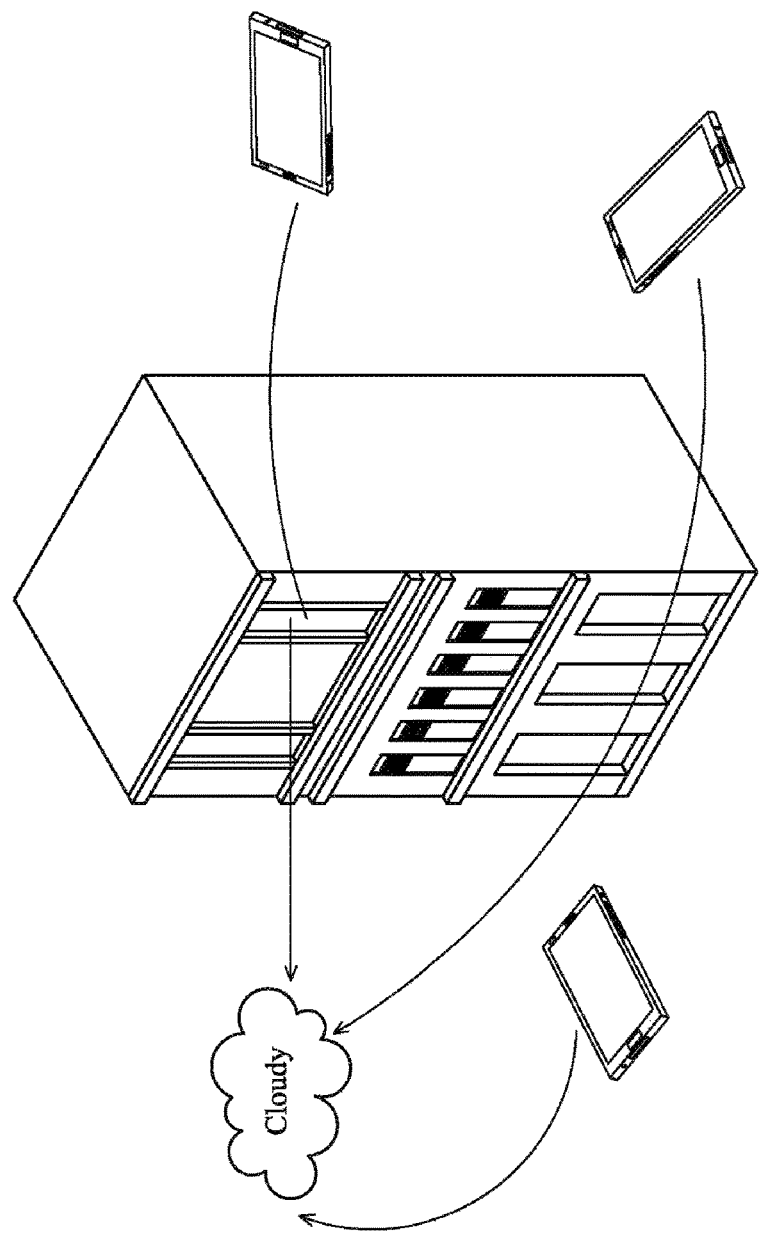
FIG. 13 shows that different users may use their smartphones to take panoramic pictures in different places of a building.

FIG. 12 depicts a data structure of the panoramic data stream in accordance with an exemplary embodiment of the disclosure. Sensor data, like orientation sensor data, position sensor data, pressure micro sensor data or any other motion sensor related data, from the motion-sensing module 110 or the positioning module 118 may be attached or inserted to the image data in the panoramic data stream. FIG. 13 shows a scenario that several neighboring portable devices are utilized to take panoramic pictures in several places. The panoramic pictures may be transmitted to a cloudy database and may be combined together according to the sensor data from the motion-sensing module 110 or the positioning module 118. Thus, a true 3D module of the real world around these portable devices may be established in some embodiments. The 3D module may further contain information about the latitude, longitude, height and color of each element (e.g. each pixel or any other element on the 3D module).

FIG. 14 is an embodiment of a flowchart depicting the operations for generating a panoramic photo/video file performed by, but not limitation, the panoramic image processor 106. Step 1402 may correlate the differences between the lens of the image sensors IS1 to ISN. In some embodiments, a mapping table may be established for the lens correlation. In step S1404, an image correction process may be performed to correct effect on the photos/videos captured by the image sensors IS1 to ISN due to different configurations among the image sensors IS1 to ISN. Such configurations may include ISO values, resolutions, frame rates, other configurations which may affect the photos/videos captured by the image sensors IS1 to ISN, or combination thereof. In an exemplary embodiment with a 12M pixels front camera and an 8M pixels rear camera, the resolution of the image captured by the front camera may be scaled down in step 1404 from the 12M pixels to the 8M pixels. In an exemplary embodiment with a front camera set to ISO 1200 and a rear camera set to ISO 100, the image captured by the front camera may be blended from the high ISO (e.g. ISO 1200) to the low ISO (e.g. ISO 100) in step 1404. In step S1406, image alignment, image composition or image extraction may be performed to align the orientation of different images, compose the images to a single image and extract the panoramic region. The image alignment process geometrically aligns two images captured in different conditions (e.g., different viewpoints, different depth, different capture time, different sensors, any other condition or combination thereof). The algorithm for the image alignment process may include: feature detection (e.g. detection of edge, contour line, corner, or any other type of feature); feature matching (e.g. building the correspondences on both images); and image alignment based on the feature correspondences. In step 1408, the image rotation process may rotate the panoramic image in accordance with motion sensor data from the motion-sensing module 110. In some exemplary embodiments, the image rotation process may further rotate the panoramic image for object tracking.

Figure 15:
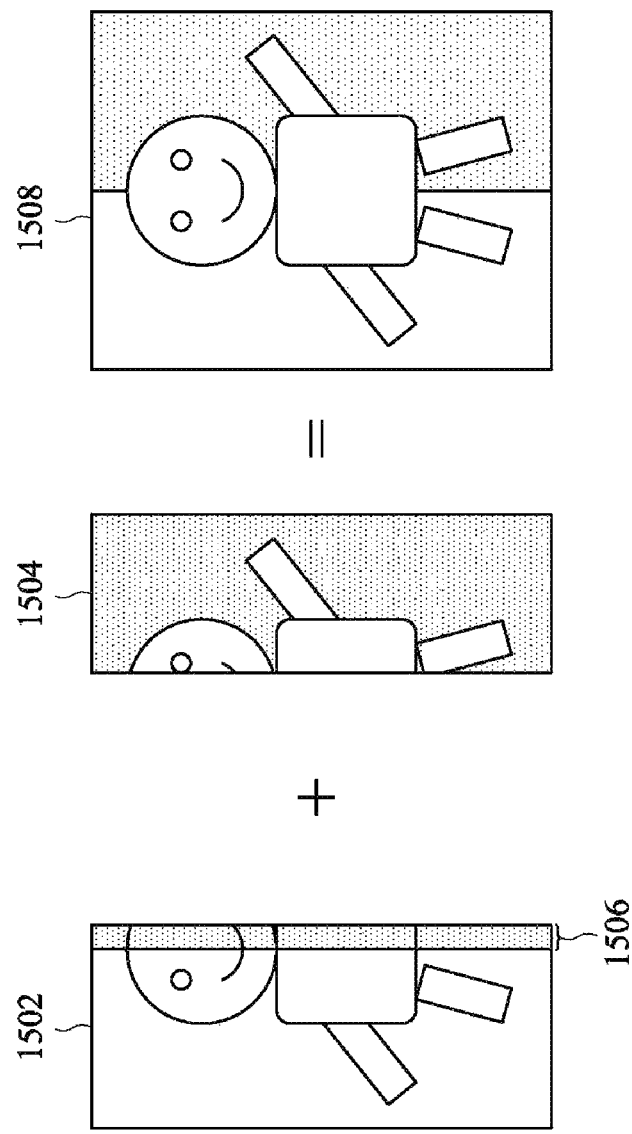
FIG. 15 shows an example for discussion of the image alignment, composition and extraction of step 1406.

FIG. 15 shows an example for discussion of the image alignment, composition and extraction of step 1406. The two images 1502 and 1504 captured by two different cameras have an overlapped region 1506. After the image alignment, composition and extraction of step 1406, a panoramic image 1508 is generated.

In some exemplary embodiments, after extracting image feature points, an image warping process may be performed based on the extracted feature points. Furthermore, image interpolation may be performed to get a larger panoramic image.

The display of panoramic photo/video/audio is discussed in the following paragraphs.

Figure 16B:
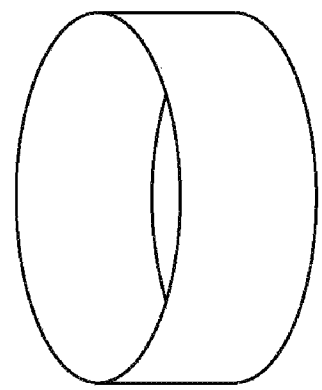
FIG. 16A, FIG. 16B and FIG. 16C show a spherical browsing mode, a cylindrical browsing mode and cubic browsing mode, respectively.
Figure 16A:
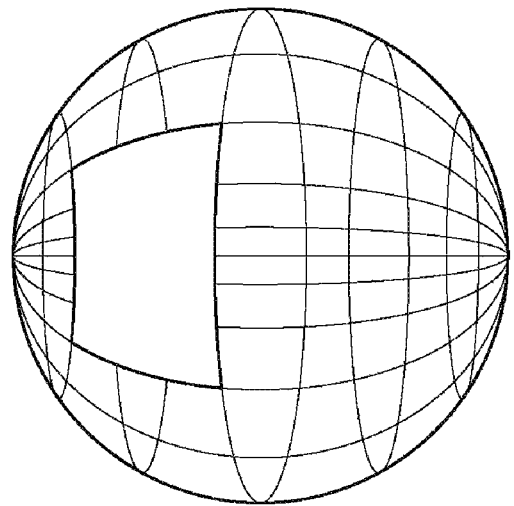
Figure 16C:
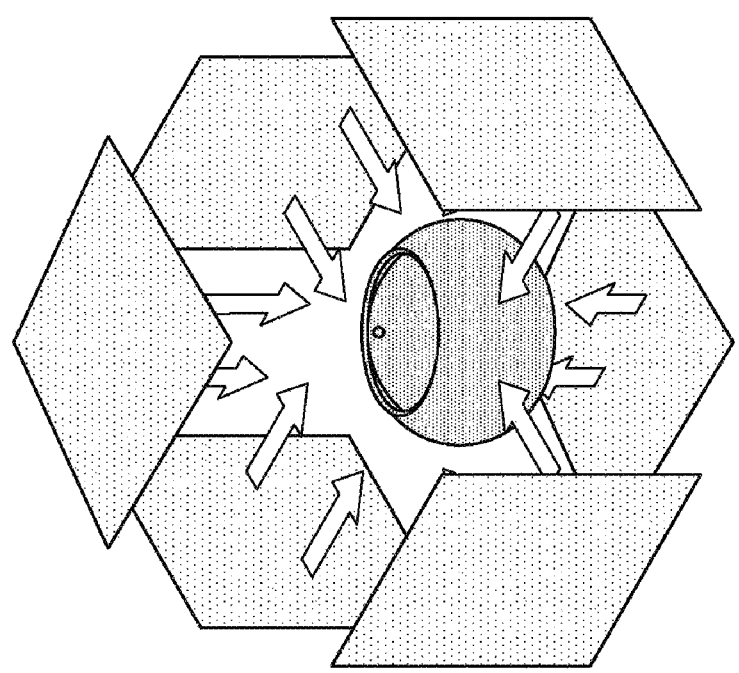

FIG. 16A, FIG. 16B and FIG. 16C show a spherical browsing mode, a cylindrical browsing mode and cubic browsing mode, respectively. The panoramic experience may be provided by any of the browsing modes.

In the spherical browsing mode of FIG. 16A, it is assumed that the environment around the point of view is photographed in a series of images that cover all 360 degrees of space, and a display image to be displayed on the display unit 104 may be generated according to a selected area on the sphere.

In the cylindrical browsing mode of FIG. 16B, it is assumed that a camera is a canonical position where the optic axis is aligned with the z axis and the y axis is vertical. When a picture is taken, the light go through the lens and falls on the image plane of the camera. The picture gets projected to the image plane. A display image to be displayed on the display unit 104 may be generated according to a selected area on the cylinder.

In the cubic browsing mode of FIG. 16C, it is assumed that the environment around the point of view is photographed in a series of images projected through a surface from all three axial directions, X, Y and Z. A polygon receives a certain projection based on its normal direction. A display image to be displayed on the display unit 104 may be generated according to a selected area on the cubic.

Figure 17:
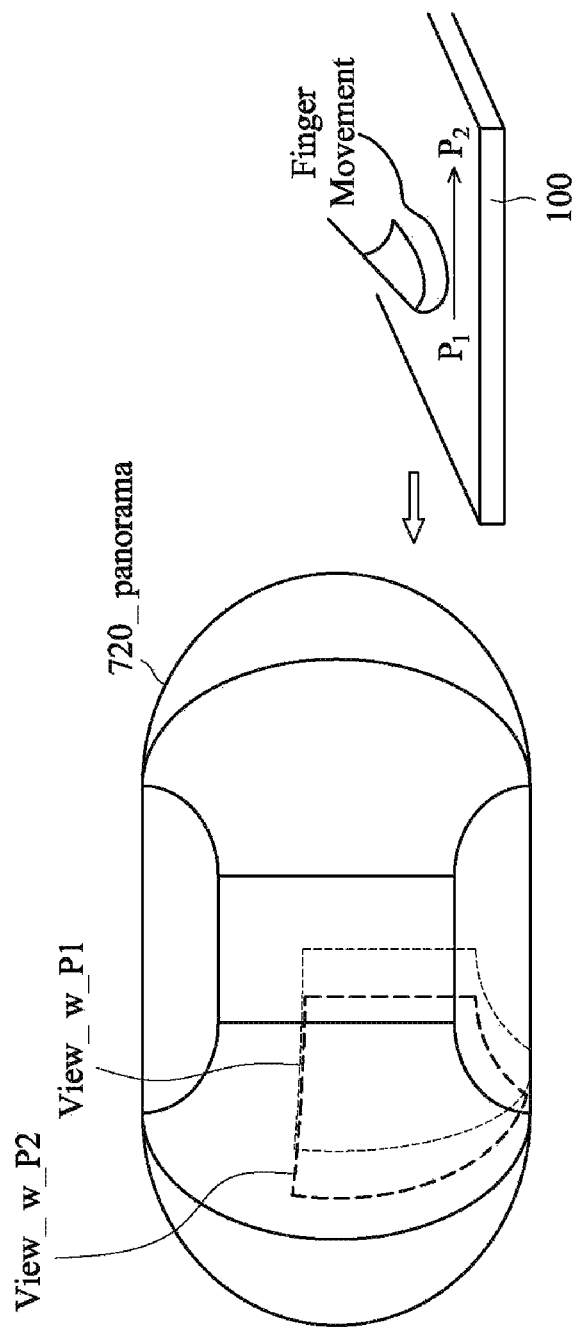
FIG. 17 shows that the panoramic view window is changed according to a user touch on a touch panel.
Figure 18:
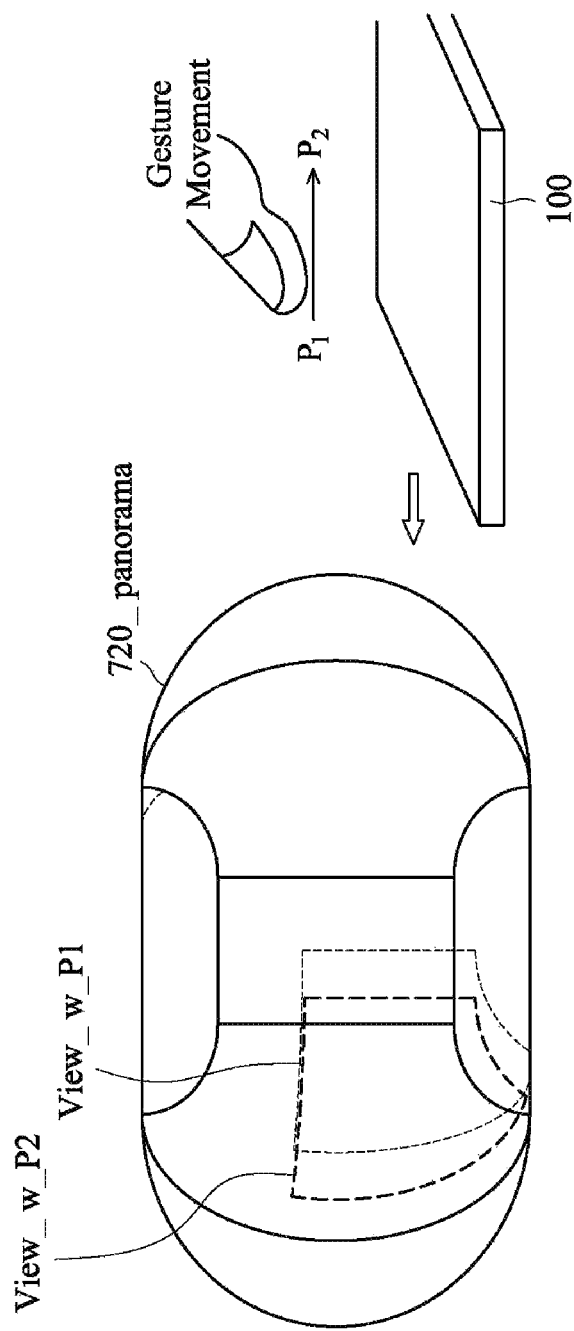
FIG. 18 shows that the panoramic view window is changed according to a user-generated gesture captured by the image sensors IS1 to ISN or an ultrasonic sensor.
Figure 19:
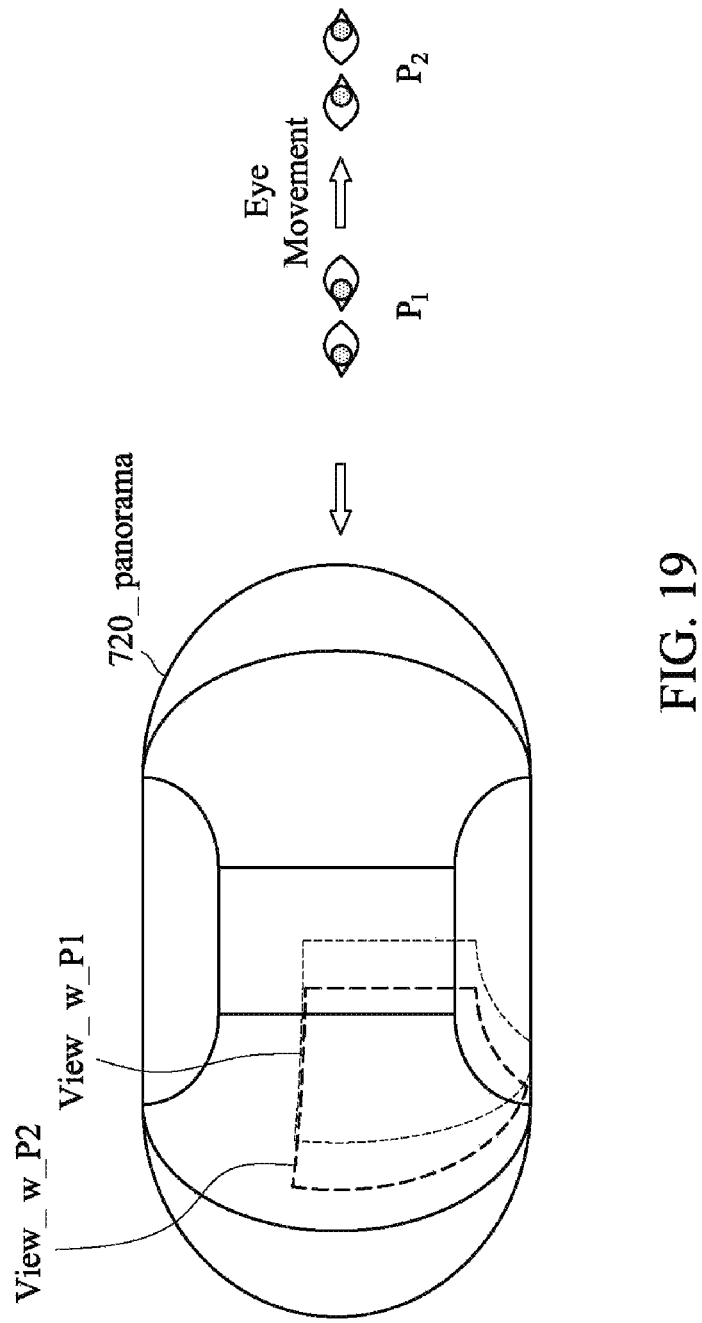
FIG. 19 shows that the panoramic view window is changed according to eye movement (another kind of user-generated gesture) captured by the image sensors IS1 to ISN.
Figure 20:
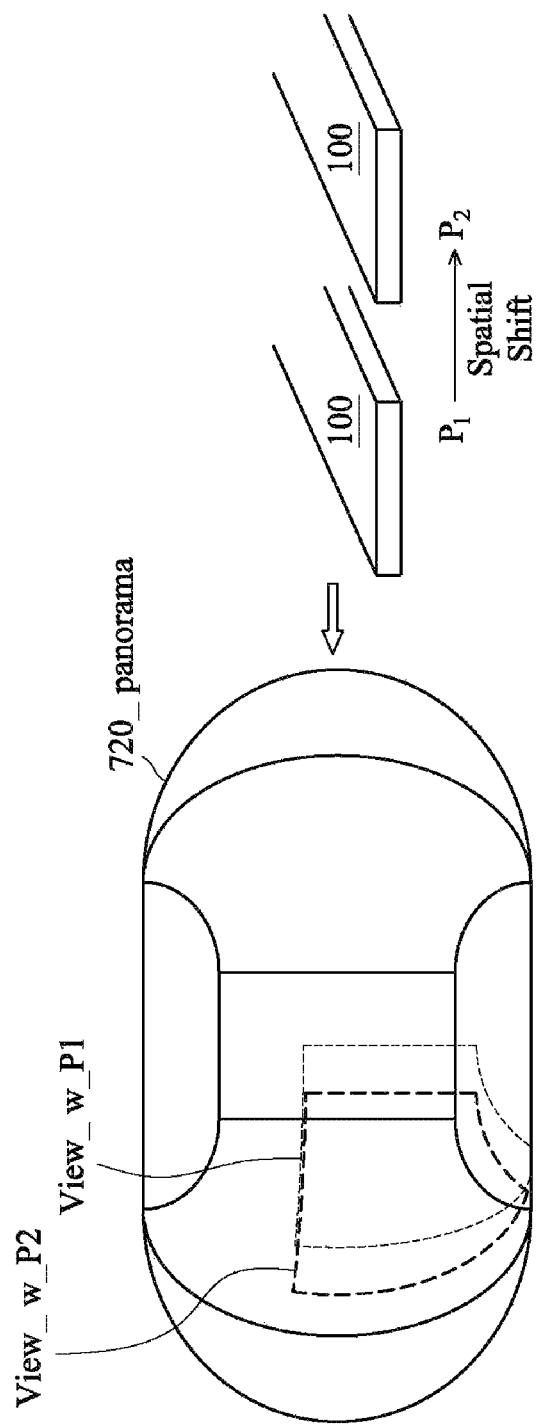
FIG. 20 shows that the panoramic view window is changed according to a motion (e.g. a spatial shift) of the portable device 100 detected by the motion-sensing module 110.

When driving the display unit 104 for panorama display, the panoramic display processor 120 may change a display image on the display unit 104 according to a change of a panoramic view window. FIG. 17 shows an example that the panoramic view window is changed (from View_W_P1 to View_W_P2) according to a user touch, moved from position P1 to P2, on a touch panel of the portable device 100. In other words, the user may swipes the touch panel of the portable device 100 to adjust the panoramic view window shown on the display unit 104. FIG. 18 shows that the panoramic view window is changed (from View_W_P1 to View_W_P2) according to a user-generated gesture, moved from position P1 to P2. In some embodiments of this invention, such user-generated gesture may be detected by the image sensors IS1 to ISN or an ultrasonic sensor. FIG. 19 shows that the panoramic view window is changed (from View_W_P1 to View_W_P2) according to eye movement (from position P1 to P2, another kind of user-generated action), which may be captured by the image sensors IS1 to ISN. FIG. 20 shows that the panoramic view window is changed (from View_W_P1 to View_W_P2) according to a motion (e.g. a spatial shift from position P1 to P2 or tilt) of the portable device 100, which may be detected by the motion-sensing module 110.

The panoramic image display processor 120 may drive the display unit 104 to display the panoramic file in a single view or in multiple views. For example, in a multiple view mode, there may be several panoramic view windows to select several areas of the panoramic file, such that images corresponding to these selected areas may be displayed on the display unit 104.

Figure 21:
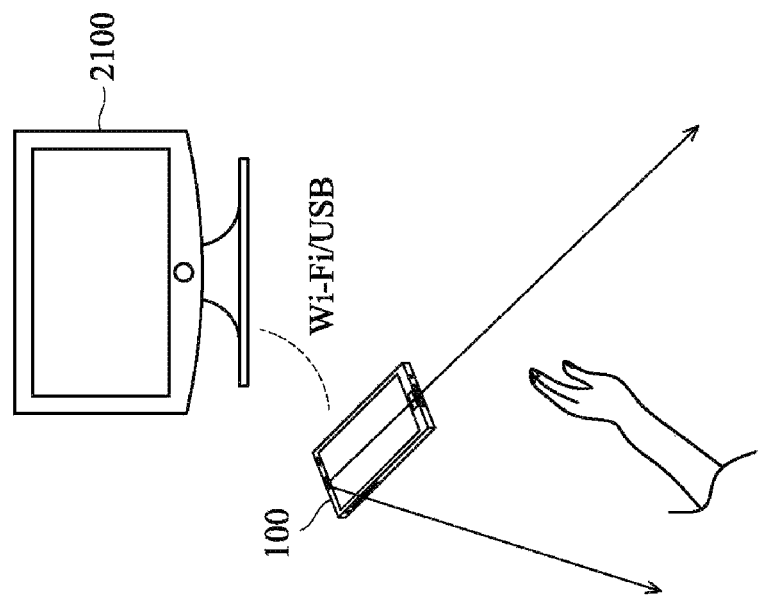
FIG. 21 shows that the portable device 100 with the gesture control system 130 built therein works as a remote control that detects the user-generated gesture and transmits gesture command to a TV or a computer 2100 via a wireless communication (e.g. Wi-Fi or BT) or a cable connection (e.g. USB)

FIG. 21 shows an example that the portable device 100 with the gesture control system 130 built therein works as a remote control that detects the user-generated gesture and transmits gesture command to a display device 2100 (e.g. a TV, a computer or any other type of display device) via a wireless communication (e.g. Wi-Fi or BT) or a cable connection (e.g. USB). Because of the panoramic photo shooting capability of the portable device 100, the user can control the target device (e.g. the display device 2100) through the portable device 100 at any place. In another exemplary embodiment, the portable device 100 itself may be the target device for the user gesture control. In an exemplary embodiment, the cursor on the target device is moved according to the user-generated gesture detected by the portable device 100.

Figure 22:
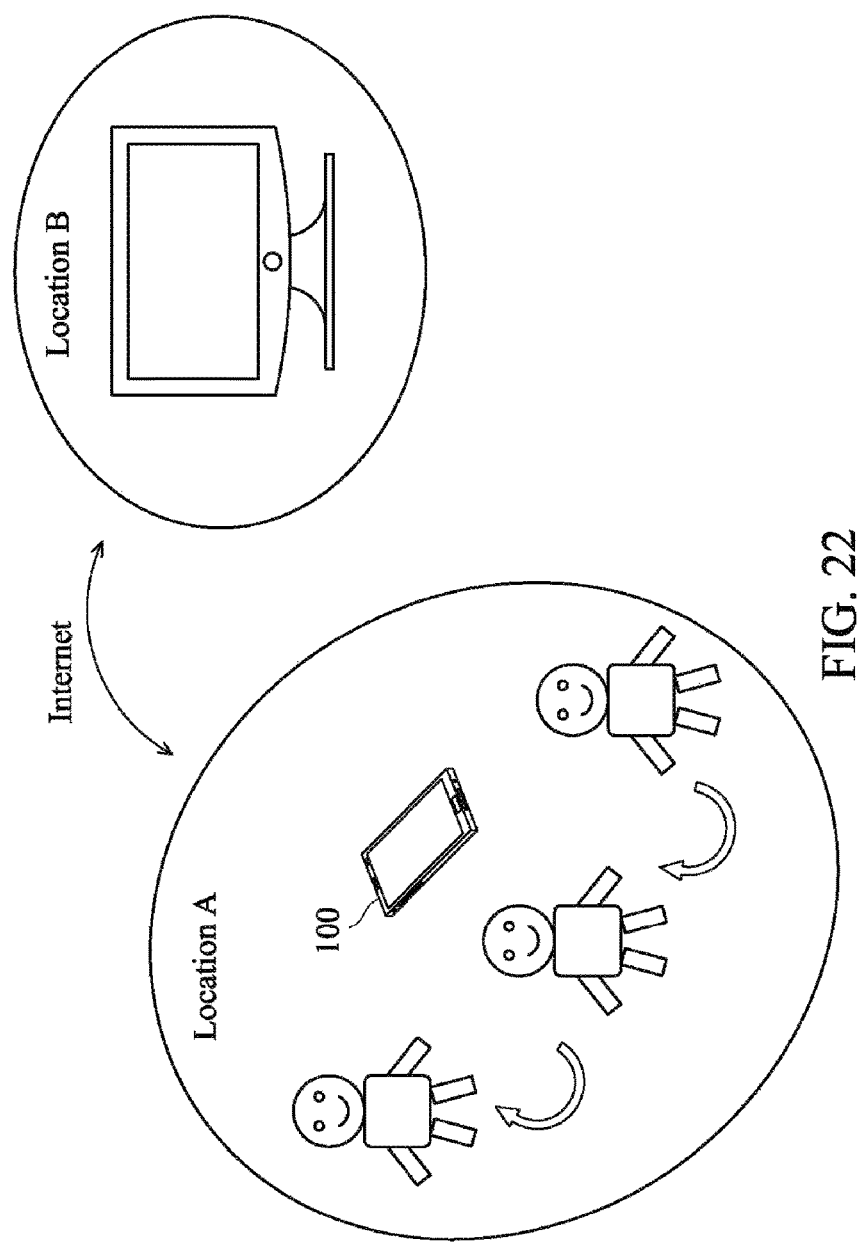
FIG. 22 shows that the portable device 100 with the video conference system 132 tracks the user's face during the video conference.

FIG. 22 shows an example that the portable device 100 with the video conference system 132 tracks the user's face during the video conference. Because of the panoramic photo shooting capability, the user's face is correctly captured by the portable device 100 even when the user is walking around the meeting room. In some embodiments, the portable device 100 may capture the panoramic photo/video with a human face or some selected object kept in a fixed position.

Figure 23:
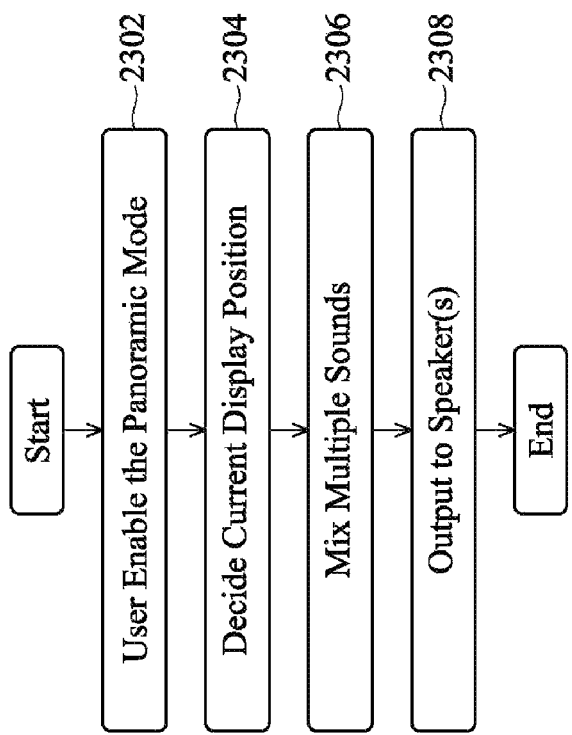
FIG. 23 is a flowchart depicting the operations of the panoramic audio processor 136.

FIG. 23 is an embodiment of a flowchart depicting the operations for generating a panoramic audio file performed by, but not limitation, the panoramic audio processor 136. When the portable device 100 has been switched to a panoramic mode in step 2302, the display position (e.g. the panoramic view window) is decided in step 2304. In step 2306, the sound signals sensed by different microphones (e.g. M1 to MM) are mixed together to form the panoramic audio corresponding to the display position. In step 2308, the mixed sound is made by the speaker 138. In some exemplary embodiments, there are multiple speakers for playing a multiple channel audio. The sound made by each speaker varies with the display position.

Figure 24:
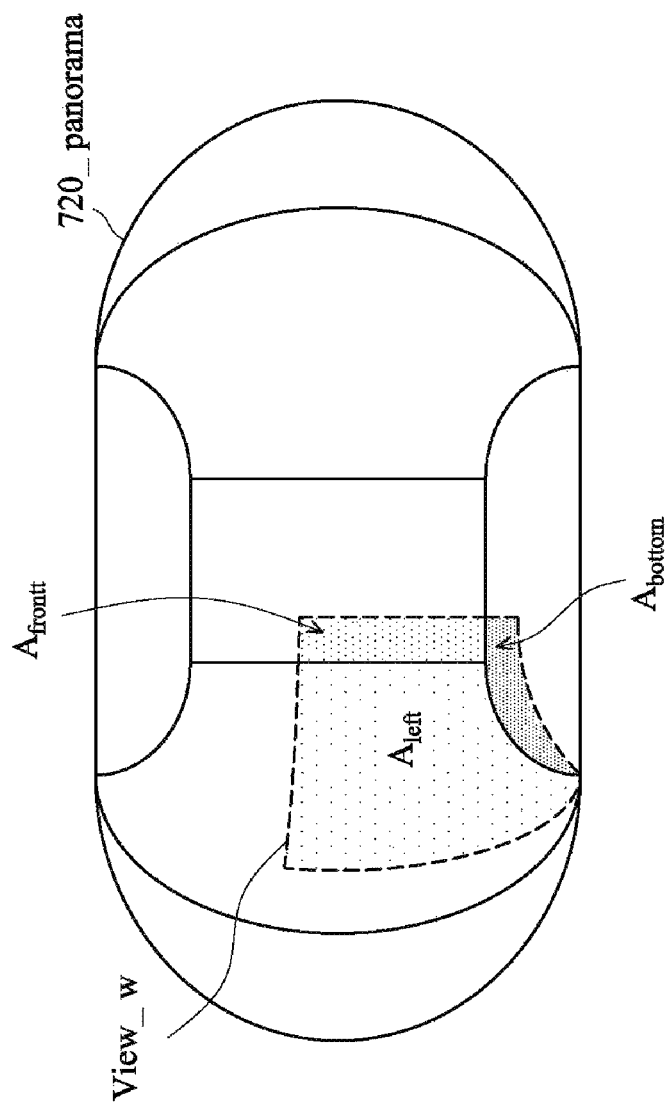
FIG. 24 shows a 720° panorama with a panoramic view window moved there on to form a display image and a panoramic audio varying with the panoramic view window.

FIG. 24 shows an embodiment that a 720° panoramic image 720_panorama and the panoramic view window View_W is moved to form a display image. The 720° panoramic image 720_panorama is formed by combining the images captured by the left camera (e.g. the camera of FIG. 4A), the front camera (e.g. the camera of FIG. 4E), and the bottom camera (e.g. the camera of FIG. 4D) of the portable device 100 respectively. According to the panoramic view window, a factor $A_{left}$ corresponding to the audio contributed from the left microphone (e.g. the microphone of FIG. 4A), a factor $A_{front}$ corresponding to the audio contributed from the front microphone (e.g. the microphone of FIG. 4E) and a factor $A_{bottom}$ corresponding to the audio contributed from the bottom microphone (e.g. the microphone of FIG. 4D) are set. In some embodiments, the factors $A_{left}$, $A_{front}$, $A_{bottom}$ may be respectively determined according to their corresponding area within the panoramic view window View_w. For example, if the area corresponding to the factor $A_{left}$ is largest within the panoramic view window View_w, a largest weight value among the factors $A_{left}$, $A_{front}$, $A_{bottom}$ may be assigned to factor $A_{left}$. The panoramic audio played by the single speaker 138 may be Sp, which is:

$$Sp=(S_{left}*A_{left}+S_{front}*A_{front}+S_{bottom}*A_{bottom})/(A_{left}+A_{front}+A_{bottom});$$

$S_{left}$ is the sound previously recorded by the left microphone, $S_{front}$ is the sound previously recorded by the front microphone and $S_{bottom}$ is the sound previously recorded by the bottom microphone. In some embodiments, the panoramic audio Sp may be further processed to generate multiple-channel audio signals for a multiple-channel speaker to play.

Figure 25:
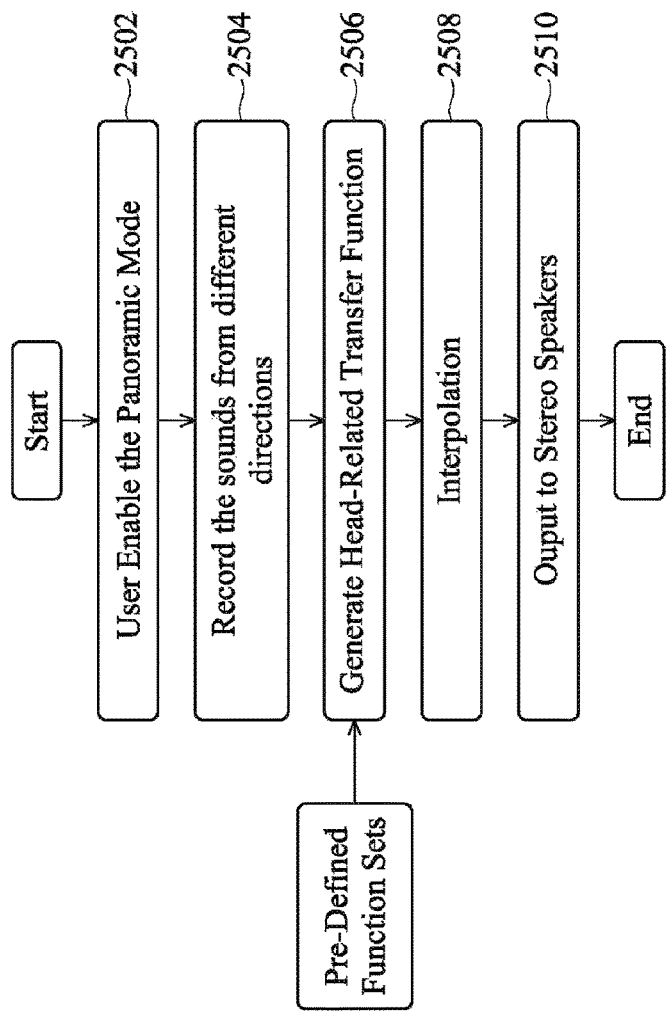
FIG. 25 is a flowchart depicting how the stereo sound is generated according to the head-related transfer function.

In another exemplary embodiment, to mimic a stereo audio, a head-related transfer function (HRTF) is applied to simulate the sounds from different directions binaurally for, but not limitation, the headphone. The head-related transfer function may be a pre-defined function or may be trained on the fly. FIG. 25 is an embodiment of a flowchart depicting how the stereo sound is generated according to the head-related transfer function. The portable device 100 is switched to a panoramic mode in step 2502 and the different microphones M1 to MM record sounds from different directions in step 2504. In step 2506, a head-related transfer function is established according to pre-defined function set. In step 2508, an interpolation is performed on the recorded sounds based on the head-related transfer function. In step 2510, the sound signals generated in step 2508 to provide a panoramic experience are output to stereo speakers for making corresponding sounds.

Figure 26:
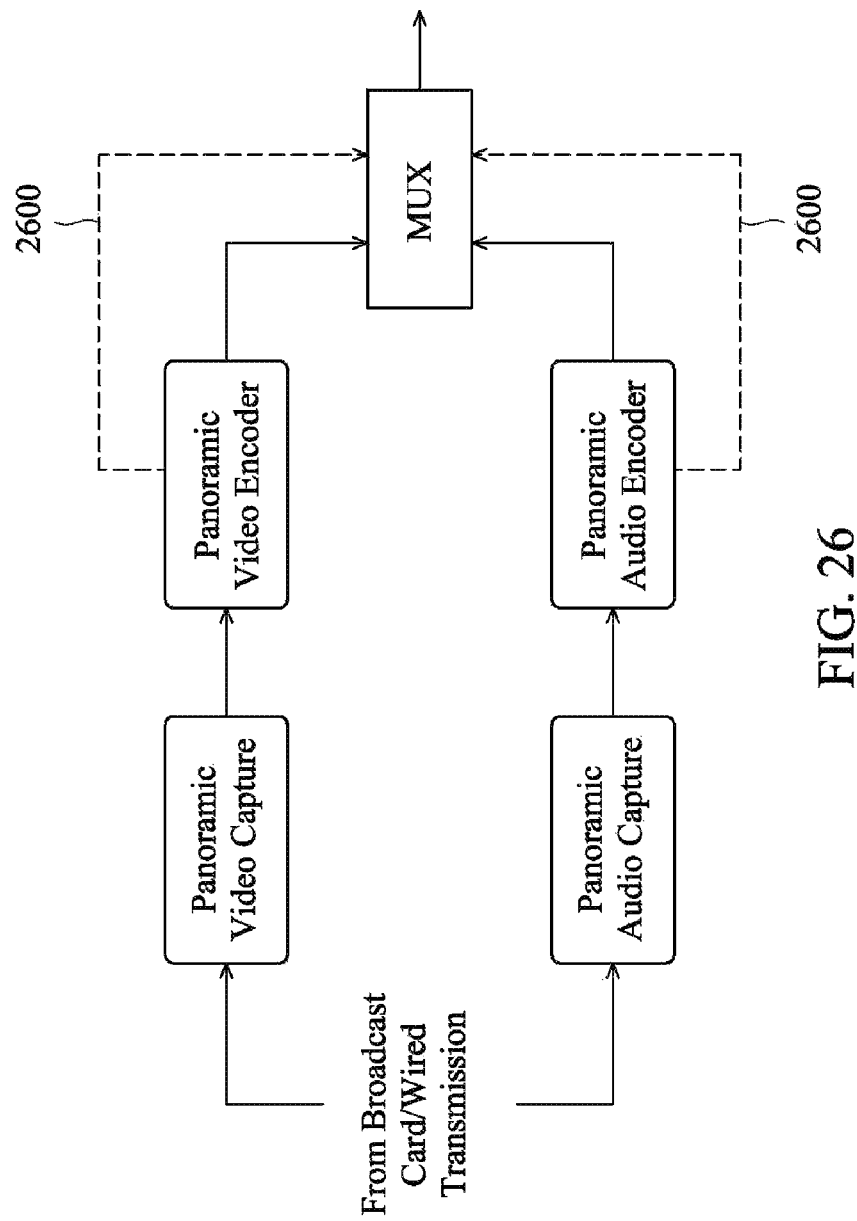
FIG. 26 shows that the sounds recorded by the microphones M1 to MM are packed with the panoramic video according to a timestamp for synchronization between video and audio.

FIG. 26 shows that the sounds recorded by the microphones M1 to MM are packed with the panoramic video according to a timestamp 2600 for synchronization between video and audio.

Figure 27:
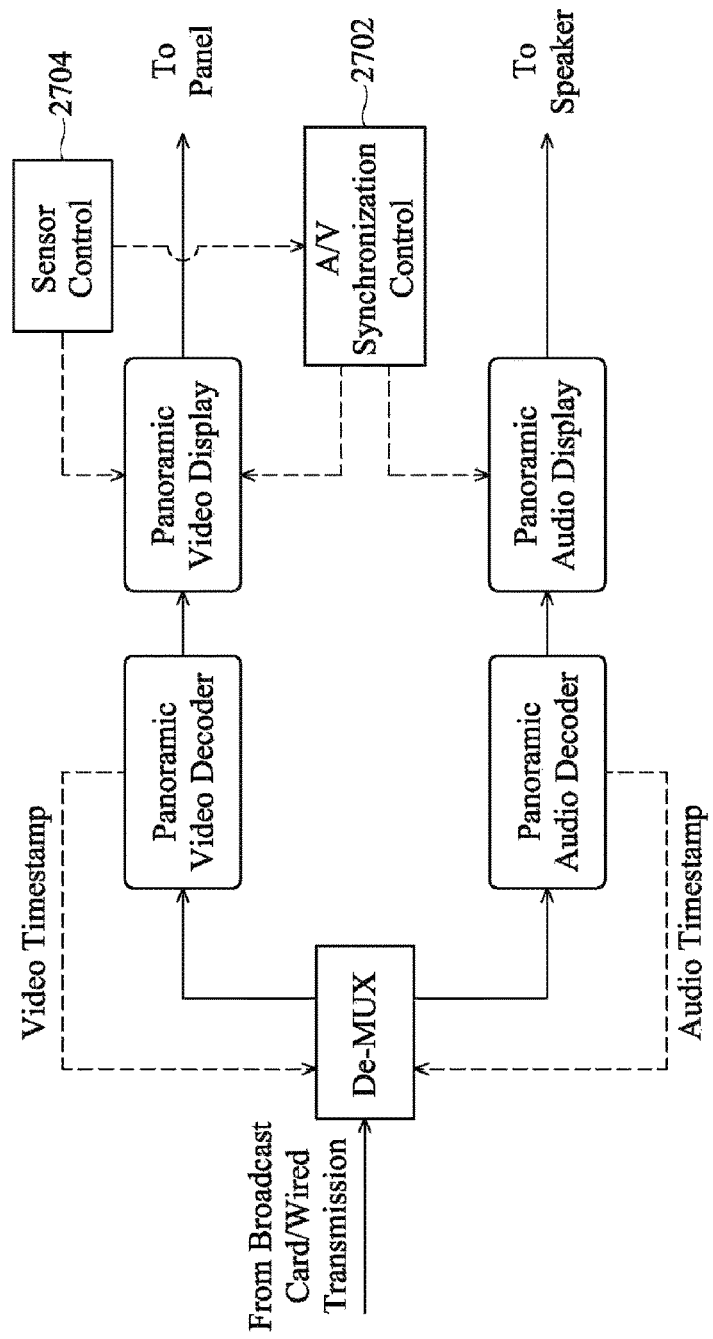
FIG. 27 shows that a bitstream containing video and audio data is de-multiplexed and separately decoded and displayed according to the timestamp.

FIG. 27 shows that a bitstream containing video and audio data is de-multiplexed and separately decoded and displayed according to the timestamp. In FIG. 27, an audio and video synchronization control 2702 dependent on the sensor control 2704 is further introduced to maintain the synchronization between the video and audio while the panoramic video changes with the motion of the portable device 100. The sensor control 2704 is based on the information detected by the motion-sensing module 110.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:

1. A portable device, comprising:
a plurality of image sensors configured to capture images of a scene that correspond to overlapped fields of view;
a plurality of audio sensors configured to record sounds of the scene that correspond to overlapped fields of sound; and
a processing circuit configured to generate a panoramic file based on the captured images and the recorded sounds in response to a received trigger signal,
wherein
the plurality of image sensors includes
a first group of image sensors disposed for sensing the scene in first respective fields of view around the portable device that are defined with respect to a first plane of the panoramic file, and
a second group of image sensors disposed for sensing the scene in second respective fields of view around the portable device that are defined with respect to a second plane of the panoramic file,
the plurality of audio sensors includes
a first group of audio sensors disposed for sensing the scene in first respective fields of sound around the portable device that are defined with respect to the first plane of the panoramic file, and
a second group of audio sensors disposed for sensing the scene in second respective fields of sound around the portable device that are defined with respect to the second plane of the panoramic file, and
the first plane of the panoramic file differs from the second plane of the panoramic file.

2. The portable device as claimed in claim 1, further comprising:
a panoramic image processor configured to process the captured images to form a panorama for presentation.

3. The portable device as claimed in claim 2, further comprising:
a motion-sensing module configured to collect motion information about the portable device when the images are being captured,
wherein the panoramic image processor is configured to process the captured images to form the panorama based on the motion information.

4. The portable device as claimed in claim 2, further comprising:
a positioning module configured to detect position or height information about the portable device when the images are being captured, such that the panorama is integrated with another panorama generated by another nearby portable device according to the position or height information about the portable device.

5. The portable device as claimed in claim 2, wherein:
the image sensors are configured to consecutively capture images to record videos to be processed by the panoramic image processor for generating a panoramic video.

6. The portable device as claimed in claim 5, further comprising:
a panoramic audio processor configured to generate a panoramic audio based on the recorded sounds.

7. The portable device as claimed in claim 6, wherein:
the panoramic audio is associated with the panoramic video according to a timestamp for synchronization between video and audio.

8. The portable device as claimed in claim 6, further comprising:
a speaker,
wherein the panoramic audio processor is configured to drive the speaker to output sounds according to a panoramic view window.

9. The portable device as claimed in claim 8, wherein:
when driving the speaker for playing the panoramic audio, the panoramic audio processor is configured to combine a plurality of sound files weighted by variable weighting factors determined according to the panoramic view window.

10. The portable device as claimed in claim 5, further comprising:
a video conference system configured to extract an image of a user's face from the panoramic video to focus a panoramic view window on the user's face.

11. The portable device as claimed in claim 5, further comprising:
a gesture controller configured to extract a gesture from the panoramic video to control a target device.

12. The portable device as claimed in claim 2, wherein:
the panoramic image processor is configured to adjust frame rates of the image sensors.

13. The portable device as claimed in claim 2, further comprising:
a panoramic display processor; and
a display,
wherein the panoramic display processor is configured to output a display image based on the panorama for the display to display.

14. The portable device as claimed in claim 13, wherein:
the panoramic display processor is configured to update the display image output to the display according to a change of a panoramic view window.

15. The portable device as claimed in claim 14, wherein:
the display is a touch panel, and
the panoramic view window is changed according to a touch operation sensed on the touch panel.

16. The portable device as claimed in claim 14, wherein:
the panoramic view window is changed according to a gesture captured by at least one of the image sensors.

17. The portable device as claimed in claim 14, further comprising:
an ultrasonic sensor,
wherein the panoramic view window is changed according to a gesture detected by the ultrasonic sensor.

18. The portable device as claimed in claim 14, further comprising:
a motion-sensing module,
wherein the panoramic view window is changed according to a motion of the portable device detected by the motion-sensing module.

19. The portable device as claimed in claim 2, wherein:
the panoramic image processor is configured to
perform lens correlation between the image sensors,
process ISO values or resolutions of the captured images,
align the captured image, or
process the captured images to form the panorama.

20. The portable device as claimed in claim 2, wherein:
the panorama is encoded as a single frame formed by the captured images.

21. The portable device as claimed in claim 1, wherein
the first plane of the panoramic file corresponds to a 360°
plane surrounding one of a yaw axis, a pitch axis, and
a roll axis of the portable device, and
the second plane of the panoramic file corresponds to
another 360° plane surrounding another one of the yaw
axis, the pitch axis, and the roll axis of the portable
device.

* * * * *